United States Patent
Kaneko et al.

(10) Patent No.: US 7,730,830 B2
(45) Date of Patent: Jun. 8, 2010

(54) STEAM COOKING APPARATUS

(75) Inventors: Fuminori Kaneko, Habikino (JP);
Yoshikazu Yamamoto, Kadoma (JP);
Takao Murai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 695 days.

(21) Appl. No.: 10/593,592

(22) PCT Filed: Dec. 16, 2004

(86) PCT No.: PCT/JP2004/018808

§ 371 (c)(1),
(2), (4) Date: Sep. 21, 2006

(87) PCT Pub. No.: WO2005/090867

PCT Pub. Date: Sep. 29, 2005

(65) Prior Publication Data

US 2007/0183555 A1   Aug. 9, 2007

(30) Foreign Application Priority Data

Mar. 22, 2004   (JP)   .............................. 2004-082362

(51) Int. Cl.
*G07F 9/10*   (2006.01)
*A45C 11/20*   (2006.01)
(52) U.S. Cl. ........................................ 99/357; 206/451
(58) Field of Classification Search ........ 99/285–323.8, 99/324–450; 206/541, 542, 543, 544, 545, 206/546, 547, 548, 549
See application file for complete search history.

(56) References Cited

U.S. PATENT DOCUMENTS 4,189,995 A   2/1980 Lohr et al.
5,010,806 A * 4/1991 Narcisi et al. .................. 99/357
5,631,033 A * 5/1997 Kolvites ...................... 426/233

FOREIGN PATENT DOCUMENTS

JP   54-46662 A   4/1979
JP   54-127769 A   10/1979

(Continued)

*Primary Examiner*—Daniel L Robinson
(74) *Attorney, Agent, or Firm*—Birch, Stewart, Kolasch & Birch, LLP

(57) ABSTRACT

Water draining means (a water drain pipe and a water drain valve (54)) is provided that drains water out of a pot. A control device (80) makes the water draining means drain the water inside the pot when one of the following conditions is fulfilled: [1] the retention time counted by a first time counter (101*a*) has reached a predetermined time; [2] the total time, as counted by a second time counter (101*b*), that has elapsed after the water started to be fed has reached a predetermined time; [3] the total amount of water, as detected by a fed water amount detector (102), that has been fed into the pot has reached a predetermined amount; [4] the total water feed time, as counted by a third time counter (101*c*), for which the water has been fed into the pot has reached a predetermined time; and [5] an instruction to drain the water is entered via an operation panel (13). Thus, while the amount of water consumed and the work burden on the user associated with water replenishment are reduced, the water retained inside the steam generating device (pot) is prevented from getting spoilt, and the interior of the steam generating means can be kept sanitary.

24 Claims, 12 Drawing Sheets

FOREIGN PATENT DOCUMENTS

| | | |
|---|---|---|
| JP | 55-87412 U | 6/1980 |
| JP | 1-169902 U | 11/1989 |
| JP | 4-53483 U | 5/1992 |
| JP | 6-82049 A | 3/1994 |
| JP | 6-241406 A | 8/1994 |
| JP | 7-243649 A | 9/1995 |
| JP | 09-004849 A | 1/1997 |
| JP | 9-26140 A | 1/1997 |
| JP | 10-253006 A | 9/1998 |
| JP | 11-33045 A | 2/1999 |
| JP | 11-94203 A | 4/1999 |
| JP | 2003-262338 A | 9/2003 |
| JP | 2004-11995 A | 1/2004 |

* cited by examiner

STEAM COOKING APPARATUS

TECHNICAL FIELD

The present invention relates to a steam cooking apparatus that heat-cooks an article-to-be-heated by jetting steam onto the article-to-be-heated placed inside a heating chamber.

BACKGROUND ART

There have conventionally been proposed various steam cooking apparatuses that heat-cook an article-to-be-heated placed inside a heating chamber by feeding into it steam generated with a steam generating device (for example, a pot). One such steam cooking apparatus is disclosed in Patent Document 1 listed below. In this steam cooking apparatus, after an article-to-be-heated is steam-cooked with steam generated with a steam generating device, while the heater of the steam generating device is kept de-energized, cooling water is fed into the steam generating device. Thus, after steam-cooking, the steam generating device is quickly cooled, so that the user can readily start after-cooking work (for example, the cleaning of the interior of the apparatus). The water that has been fed into the steam generating device is drained through a drain passage.

On the other hand, in the apparatus disclosed in Patent Document 2 listed below, when an operation member for requesting the stop of operation is operated, all the liquid present inside a steam generating device is drained. Thus, every day, when the operation of the apparatus is stopped, impurities that have been concentrated inside the steam generating device are drained. In this way, without a need for the steam generating device to be provided with a control device such as a concentration meter, the apparatus can continue its day-to-day operation.

Patent Document 1: JP-A-H7-243649

Patent Document 2: JP-A-H11-94203

DISCLOSURE OF THE INVENTION

Problems to be Solved by the Invention

In both of the apparatuses disclosed in Patent Documents 1 and 2 mentioned above, every time their operation (steam-cooking) is stopped, the water inside the steam generating device is drained. Thus, the interior of the steam generating device can be kept sanitary, indeed. On the other hand, however, they consume a large amount of water every such time, and accordingly the water feed device (for example, a water feed tank) that feeds water to the steam generating device needs to be replenished with water as frequently. Disadvantageously, this increases the work burden on the user.

The frequency of the replenishment of the water feed tank with water can be reduced by increasing the capacity of the water feed tank. Undesirably, however, this makes the apparatus as a whole unduly large, and poses restrictions on the arrangement of other components.

To overcome the disadvantages mentioned above, it is an object of the present invention to provide a steam cooking apparatus that, while reducing the amount of water consumed and hence the work burden on the user associated with water replenishment, can avoid retention of spoilt water inside a steam generating device and can thus keep the interior thereof sanitary.

MEANS FOR SOLVING THE PROBLEM (1) A steam cooking apparatus according to the present invention is provided with: steam generating means (for example, a pot) that generates steam from water fed thereinto from water feeding means (for example, a water tank and a water feed pump) and that feeds the steam into a heating chamber in which an article-to-be-heated is heated; first time counting means that counts the retention time for which the water present inside the steam generating means is retained there; water draining means (for example, a water drain pipe and a water drain valve) that drains the water inside the steam generating means; and controlling means that controls operation of the water draining means. Here, when the retention time counted by the first time counting means has reached a predetermined time, the controlling means makes the water draining means drain the water inside the steam generating means. The predetermined time just mentioned is set to be, for example, shorter than the time in which the water inside the steam generating means is likely to get spoilt.

With the configuration described above, the water inside the steam generating means is drained by the water draining means. This reduces the deposition and collection, as scale, of impurities (for example, Ca and Mg) contained in the water inside the steam generating means, and thus helps keep the interior of the steam generating means sanitary.

Moreover, under the control of the controlling means, the drainage of the water inside the steam generating means takes place when the time counted by the first time counting means, i.e. the retention time for which the water present inside the steam generating means has been retained there, has reached the predetermined time. With this control, the water inside the steam generating means is drained before getting spoilt. This prevents spoilt water from being retained inside the steam generating means. From this perspective also, the interior of the steam generating means can be kept sanitary.

Moreover, with the control described above, unless the retention time of the water present inside the steam generating means reaches the predetermined time, even after the operation of the steam cooking apparatus is stopped, the water inside the steam generating means is not immediately drained. This eliminates the need to drain water out of the steam generating means frequently, i.e. every time the operation of the steam cooking apparatus is stopped, as conventionally practiced, and thus helps avoid an undue increase in the amount of water consumed. This in turn reduces the frequency with which the user needs to replenish the water feeding means with water, and thus helps reduce the work burden on the user.

(2) In the steam cooking apparatus according to the present invention, the first time counting means may count, as a first retention time, the time for which the water fed into the steam generating means before evaporation thereby is retained so that, when the first retention time has reached a first predetermined time set with respect to the water (the water present inside the steam generating means before evaporation), the controlling means makes the water draining means drain the water inside the steam generating means.

Here, the first predetermined time set with respect to the water is set to be, for example, shorter than the time in which the water fed into the steam generating means before evaporation is likely to get spoilt. During this period, the water is not yet been evaporated, thus contains chlorine, and is thus less prone to get spoilt. Thus, the first predetermined time can be set to be comparatively long, for example about three days.

With this configuration where, as described above, the water inside the steam generating means is drained when the first retention time has reached the first predetermined time, the water fed into the steam generating means before evaporation is prevented from getting spoilt and being retained inside the steam generating means.

(3) In the steam cooking apparatus according to the present invention, the first time counting means counts, as a second retention time, the time for which the water retained inside the steam generating means after evaporation thereby is retained so that, when the second retention time has reached a second predetermined time set with respect to the water, the controlling means makes the water draining means drain the water inside the steam generating means.

Here, the second predetermined time set with respect to the water is set to be, for example, shorter than the time in which the water retained inside the steam generating means after evaporation is likely to get spoilt. During this period, the water has lost chlorine through evaporation, and is thus prone to get spoilt. Thus, the second predetermined time can be set to be comparatively short, for example about one day.

With this configuration where, as described above, the water inside the steam generating means is drained when the second retention time has reached the second predetermined time, the water retained inside the steam generating means after evaporation is prevented from getting spoilt and being retained inside the steam generating means.

(4) In the steam cooking apparatus according to the present invention, the first time counting means may count, as a first retention time, the time for which the water fed into the steam generating means before evaporation thereby is retained, and also count, as a second retention time, the time for which the water retained inside the steam generating means after evaporation thereby is retained. In this case, according to the operation status of the steam cooking apparatus, the controlling means selects one of the first and second retention times, and selects one of a first predetermined time set with respect to the water fed into the steam generating means before evaporation and a second predetermined time set with respect to the water retained inside the steam generating means after evaporation so that, when the selected retention time has reached the selected predetermined time, the controlling means makes the water draining means drain the water inside the steam generating means.

Depending on the operation status of the steam cooking apparatus (for example, whether the steam generating means has just been fed with water from the water feeding means or the steam generating means has already generated steam), the water present inside the steam generating means either contains chlorine or contains no chlorine. Therefore, according to the operation status of the steam cooking apparatus, the controlling means selects one of the first and second retention times counted by the first time counting means, and selects one of a first predetermined time set with respect to the water before evaporation and a second predetermined time set with respect to the water after evaporation; the controlling means then compares the selected retention time with the selected predetermined time, and controls drainage. With this drainage control according to the operation status of the steam cooking apparatus, irrespective of whether the water present inside the steam generating means is that before evaporation and containing chlorine or that after evaporation and containing no chlorine, it can surely be prevented from getting spoilt and being retained inside the steam generating means.

(5) Another steam cooking apparatus according to the present invention is provided with: steam generating means that generates steam from water fed thereinto from water feeding means and that feeds the steam into a heating chamber in which an article-to-be-heated is heated; second time counting means that counts the total time that has elapsed after the water feeding means started to feed the water into the steam generating means; water draining means that drains the water inside the steam generating means; and controlling means that controls the operation of the water draining means. Here, when the retention time counted by the second time counting means has reached a predetermined time, the controlling means makes the water draining means drain the water inside the steam generating means.

(6) Another steam cooking apparatus according to the present invention is provided with: steam generating means that generates steam from water fed thereinto from water feeding means and that feeds the steam into a heating chamber in which an article-to-be-heated is heated; fed water amount detecting means that detects the total amount of water that the water feeding means has fed into the steam generating means; water draining means that drains the water inside the steam generating means; and controlling means that controls the operation of the water draining means. Here, when the total amount of water detected by the fed water amount detecting means has reached a predetermined amount, the controlling means makes the water draining means drain the water inside the steam generating means.

(7) Another steam cooking apparatus according to the present invention is provided with: steam generating means that generates steam from water fed thereinto from water feeding means and that feeds the steam into a heating chamber in which an article-to-be-heated is heated; third time counting means that counts, as a total water feed time, the net total time for which the water feeding means has fed the water into the steam generating means; water draining means that drains the water inside the steam generating means; and controlling means that controls the operation of the water draining means. Here, when the total water feed time counted by the third time counting means has reached a predetermined time, the controlling means makes the water draining means drain the water inside the steam generating means.

(8) Another steam cooking apparatus according to the present invention is provided with: steam generating means that generates steam from water fed thereinto from water feeding means and that feeds the steam into a heating chamber in which an article-to-be-heated is heated; water draining means that drains the water inside the steam generating means; controlling means that controls the operation of the water draining means; and input means via which an instruction to drain the water is fed in. Here, when an instruction to drain the water is fed in via the input means, the controlling means makes the water draining means drain the water inside the steam generating means.

With one of the configurations (5) to (8) described above, the water inside the steam generating means is drained by the water draining means. This reduces the deposition and collection, as scale, of impurities (for example, Ca and Mg) contained in the water inside the steam generating means, and thus helps keep the interior of the steam generating means sanitary.

Moreover, under the control of the controlling means, the drainage of the water inside the steam generating means takes place when one of the following conditions is fulfilled: the total time, as counted by the second time counting means, that has elapsed after the water started to be fed has reached a predetermined time (for example, several hours); the total amount of water, as detected by the fed water amount detecting means, that has been fed reached a predetermined amount; the total water feed time, as counted by the third time counting means, for which the water has been fed has reached a predetermined time; and an instruction to drain the water is fed in via the input means.

That is, unless one of these conditions is fulfilled, even when the operation of the steam cooking apparatus is stopped meanwhile, no water is drained out of the steam generating means. This eliminates the need to drain water out of the steam generating means frequently, i.e. every time the operation of the steam cooking apparatus is stopped, and thus helps avoid unduly increasing the amount of water consumed. This in turn reduces the frequency with which the user needs to replenish the water feeding means with water, and thus helps reduce the work burden on the user.

Moreover, owing to the controlling means controlling in one of the manners described above, the water inside the steam generating means is drained before it is likely to get spoilt. This prevents spoilt water from being retained inside the steam generating means.

(9) The steam cooking apparatus according to the present invention may be further provided with: water temperature detecting means that measures the water temperature of the water inside the steam generating means. In this case, when the water temperature detected by the water temperature detecting means is equal to or higher than a predetermined temperature, the controlling means stops the water draining means from draining the water inside the steam generating means.

When the temperature of the water inside the steam generating means is hot, i.e. equal to or higher than the predetermined temperature, the impurities contained therein are prompted to crystallize. Thus, draining the water in this state makes deposition and collection of scale inside the steam generating means more likely. With the configuration described above, however, when the temperature of the water inside the steam generating means as detected by the water temperature detecting means is equal to or higher than the predetermined temperature, the controlling means stops the drainage of water out of the steam generating means. This surely reduces the deposition and collection of scale inside the steam generating means resulting from the water being drained while it is hot enough to prompt the deposition and collection of scale.

(10) The steam cooking apparatus according to the present invention may be further provided with: a water drain tank in which the water drained by the water draining means is collected; and information detecting means that detects information on the water drain tank or on the water inside the water drain tank. In this case, according to the information detected by the information detecting means, the controlling means controls the drainage of the water inside the steam generating means by the water draining means.

The information detected by the information detecting means is, for example, information on the state of attachment of the water drain tank to the steam cooking apparatus, or information on the water level inside the water drain tank. According to such information, the controlling means controls the drainage of the water inside the steam generating means. For example, the following configuration is possible.

When the water drain tank is not attached, the controlling means stops the drainage of the water inside the steam generating means; when the water drain tank is attached, the controlling means permits the drainage of the water inside the steam generating means. Or, when the water level inside the water drain tank is equal to or lower than a predetermined water level, the controlling means permits the drainage of the water inside the steam generating means to the water drain tank; when the water level inside the water drain tank is higher than the predetermined water level, the controlling means stops the drainage.

In this way, according to the information detected by the information detecting means, the controlling means controls the drainage of the water inside the steam generating means. This ensures that the drained water is collected in the water drain tank. In other words, inconveniences, such as the drained water dripping from the water drain tank, can surely be avoided.

(11) In the steam cooking apparatus according to the present invention, the information detecting means may include an attachment state detector that detects the attachment state of the water drain tank so that, when the attachment state detector detects that the water drain tank is attached to the steam cooking apparatus, the controlling means makes the water draining means drain the water inside the steam generating means.

With this configuration, according to the detection by the attachment state detector, the water drained out of the steam generating means can surely be collected in the water drain tank attached to the steam cooking apparatus. Thus, it does not occur that the water drained out of the steam generating means drips elsewhere than into the water drain tank.

(12) In the steam cooking apparatus according to the present invention, the information detecting means may include a water level detector that detects the water level of the water inside the water drain tank so that, when the water level detector detects that the water level of the water inside the water drain tank is equal to or lower than a predetermined water level, the controlling means makes the water draining means drain the water inside the steam generating means.

Here, the drainage of the water inside the steam generating means to the water drain tank takes place when the water level detector detects that the water level of the water inside the water drain tank is equal to or lower than the predetermined level. Thus, when the water inside the steam generating means is drained to the water drain tank, the water is prevented from overflowing out of the water drain tank.

(13) The steam cooking apparatus according to the present invention may be further provided with: indicating means that indicates a warning when the information detecting means detects that the water drain tank is not attached to the steam cooking apparatus or that the water level of the water inside the water drain tank is higher than a predetermined water level.

When the water drain tank is not attached to the steam cooking apparatus, or when the water level inside the water drain tank is higher than the predetermined water level, if the water inside the steam generating means is drained, the water may drip elsewhere than into the water drain tank, or overflow out of the water drain tank. This makes drainage impossible. Therefore, when such information on the water drain tank is detected by the information detecting means, the indicating means indicates a warning. Thus, the user can, for example, attach the water drain tank or dispose of the water inside the water drain tank to enable the drainage of the water inside the steam generating means as soon as possible.

(14) The steam cooking apparatus according to the present invention may be further provided with: a movable member that changes the position of the water level detector as the water drain tank is put into or taken out of the steam cooking apparatus.

With this configuration, while the water drain tank is being put into (i.e. when it is still detached from) the steam cooking apparatus, the water level detector is kept out of contact with the water drain tank; when the water drain tank is completely put into (i.e. when it is attached to) the steam cooking apparatus, the water level detector is located inside the water drain tank so that it can detect the water level inside the water drain tank. Thus, when the water drain tank is put into and taken out of the steam cooking apparatus, the water level detector is prevented from being damaged by hitting the water drain tank, and, once the water drain tank is attached, the water level detector can surely detect the water level of the water inside the water drain tank.

ADVANTAGES OF THE INVENTION

According to the present invention, water inside steam generating means is drained by water draining means. This reduces deposition and collection, as scale, of impurities contained in the water, and thus helps keep the interior of the steam generating means sanitary.

In addition, under the control of controlling means, the drainage of the water inside the steam generating means takes place only when one of the conditions noted previously is fulfilled. Thus, unless one of those conditions is fulfilled, even when the operation of the steam cooking apparatus is stopped meanwhile, no water is drained out of the steam generating means. This eliminates the need to drain water out of the steam generating means frequently, i.e. every time the operation of the steam cooking apparatus is stopped, and thus helps avoid unduly increasing the amount of water consumed. This in turn reduces the frequency with which the user needs to replenish the water feeding means with water, and thus helps reduce the work burden on the user.

Furthermore, under the control of the controlling means, the water inside the steam generating means is drained before it is likely to get spoilt. This prevents spoilt water from being retained inside the steam generating means.

LIST OF REFERENCE SYMBOLS

1 Steam cooking apparatus
20 Heating chamber
50 Steam generating device (Steam generating means)
51 Pot (Steam generating means)
53 Water drain pipe (Water draining means)
54 Water drain valve (Water draining means)
55 Water feed pipe (Water feeding means)
57 Water feed pump (Water feeding means)
71 Water tank (Water feeding means)
72 Water feed pipe (Water feeding means)
80 Control device (Controlling means)
101 Time counter (First, second, and third time counting means)
101*a* First time counter (First time counting means)
101*b* Second time counter (Second time counting means)
101*c* Third time counter (Third time counting means)
102 Fed water amount detector (Fed water amount detecting means)
103 Water temperature detector (Water temperature detecting means)
104 Information detector (Information detecting means)
104*a* Attachment state detector
104*b* Water level detector
105 Indicator (Indicating means)
F Article-to-be-heated

BEST MODE FOR CARRYING OUT THE INVENTION

Hereinafter, an embodiment of the present invention will be described with reference to the drawings.

Figure 1:
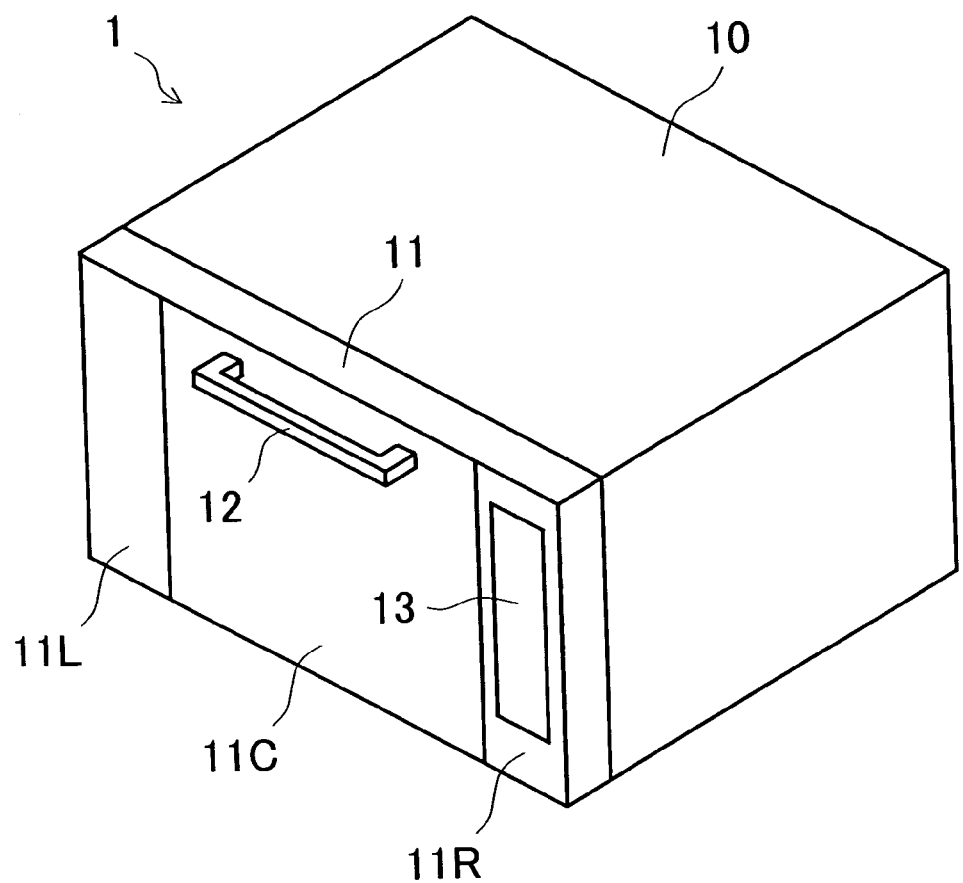
FIG. 1 An external perspective view of a steam cooking apparatus as an example of a heat-cooking apparatus embodying the present invention.
Figure 2:
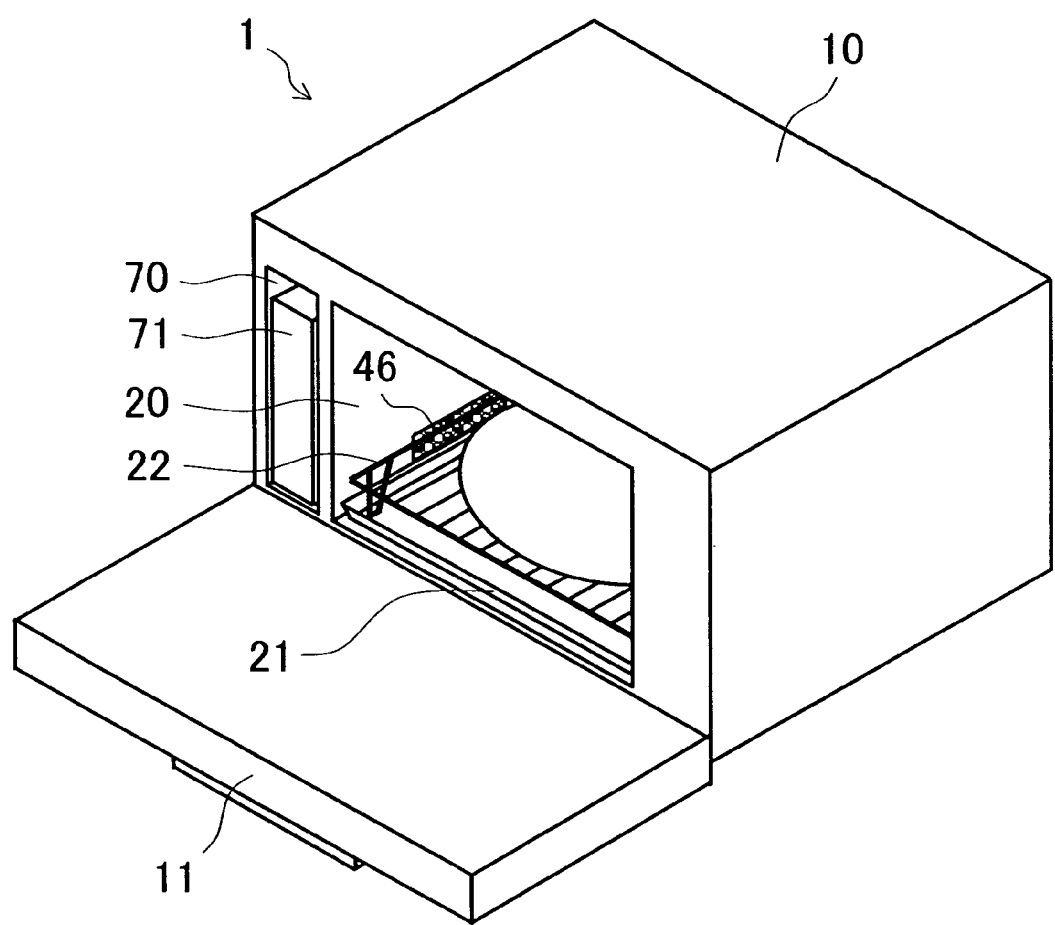
FIG. 2 An external perspective view of the steam cooking apparatus, with the door to the heating chamber opened.
Figure 3:
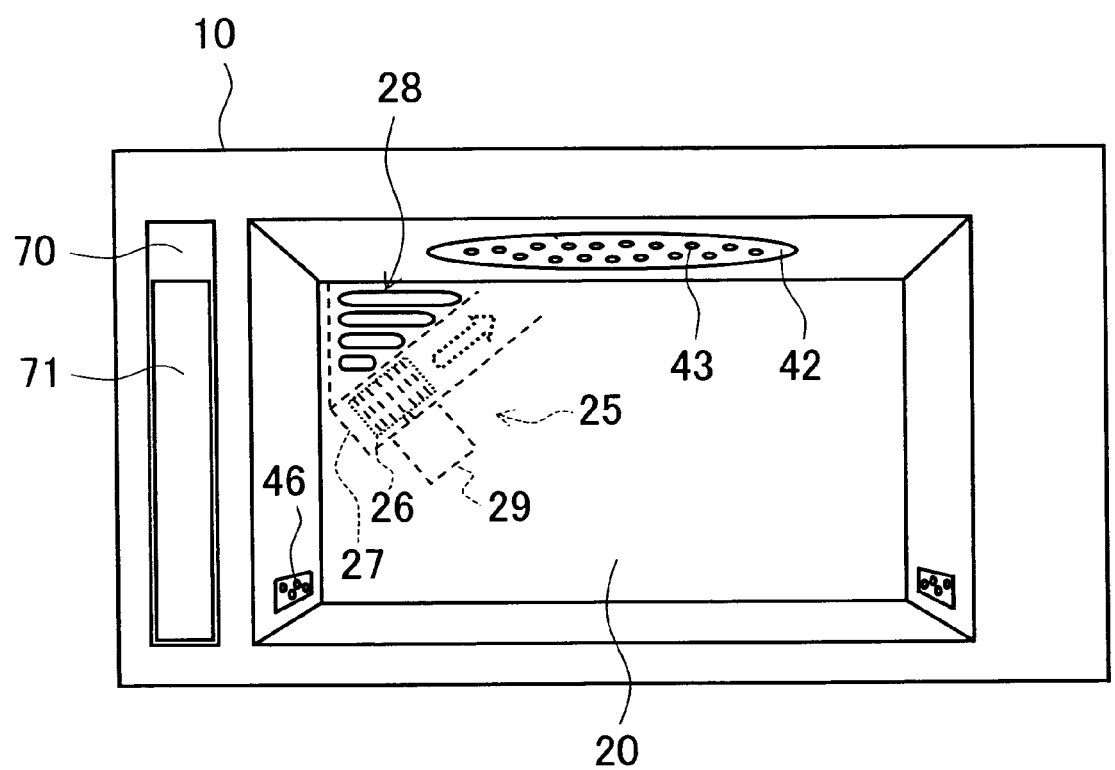
FIG. 3 A front view of the steam cooking apparatus, with the door to the heating chamber removed.
Figure 4:
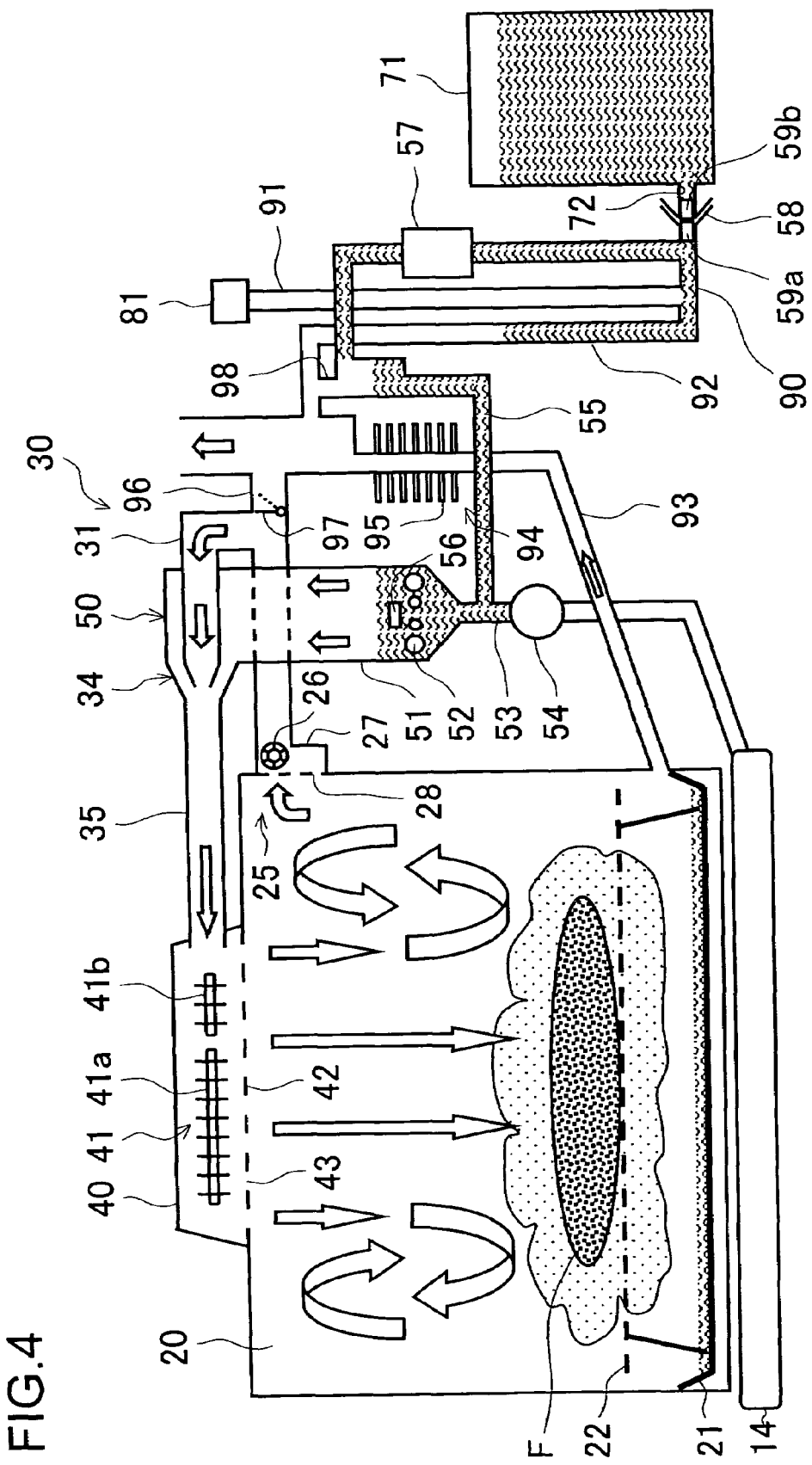
FIG. 4 A diagram illustrating the basic construction inside the steam cooking apparatus.
Figure 5:
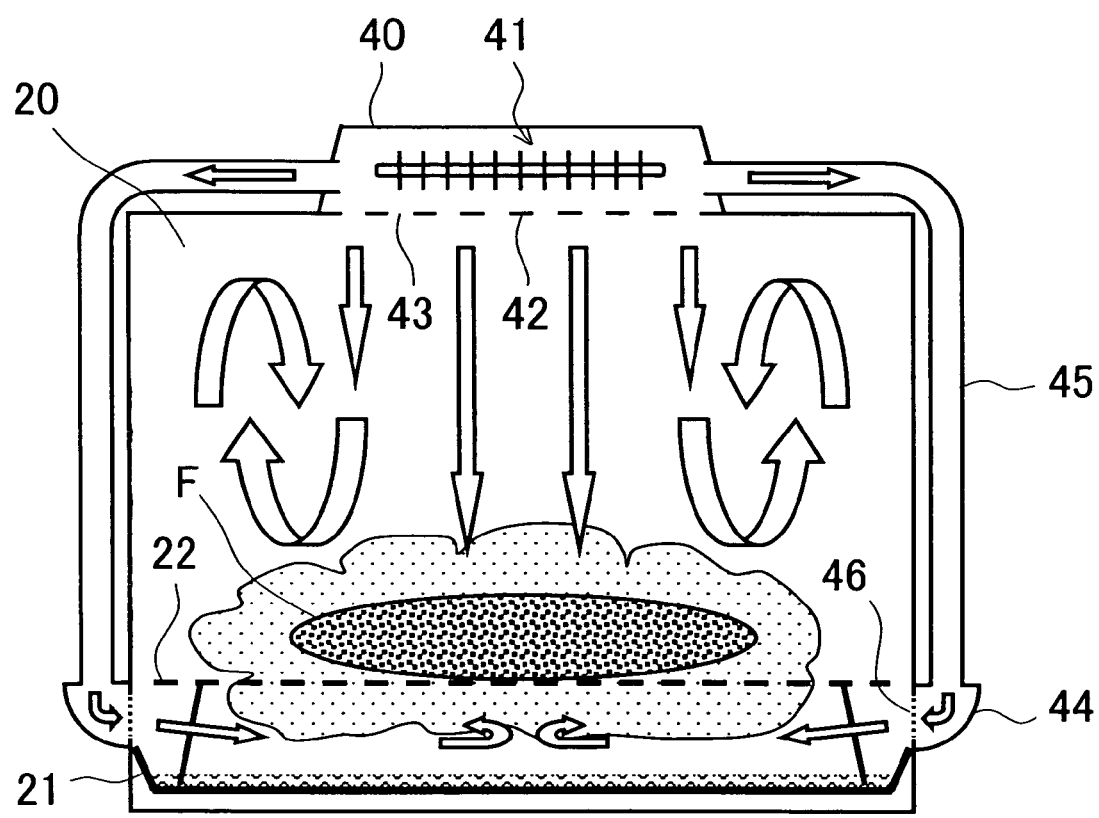
FIG. 5 A diagram illustrating the basic construction inside the steam cooking apparatus, as seen from a direction perpendicular to FIG. 4.
Figure 6:
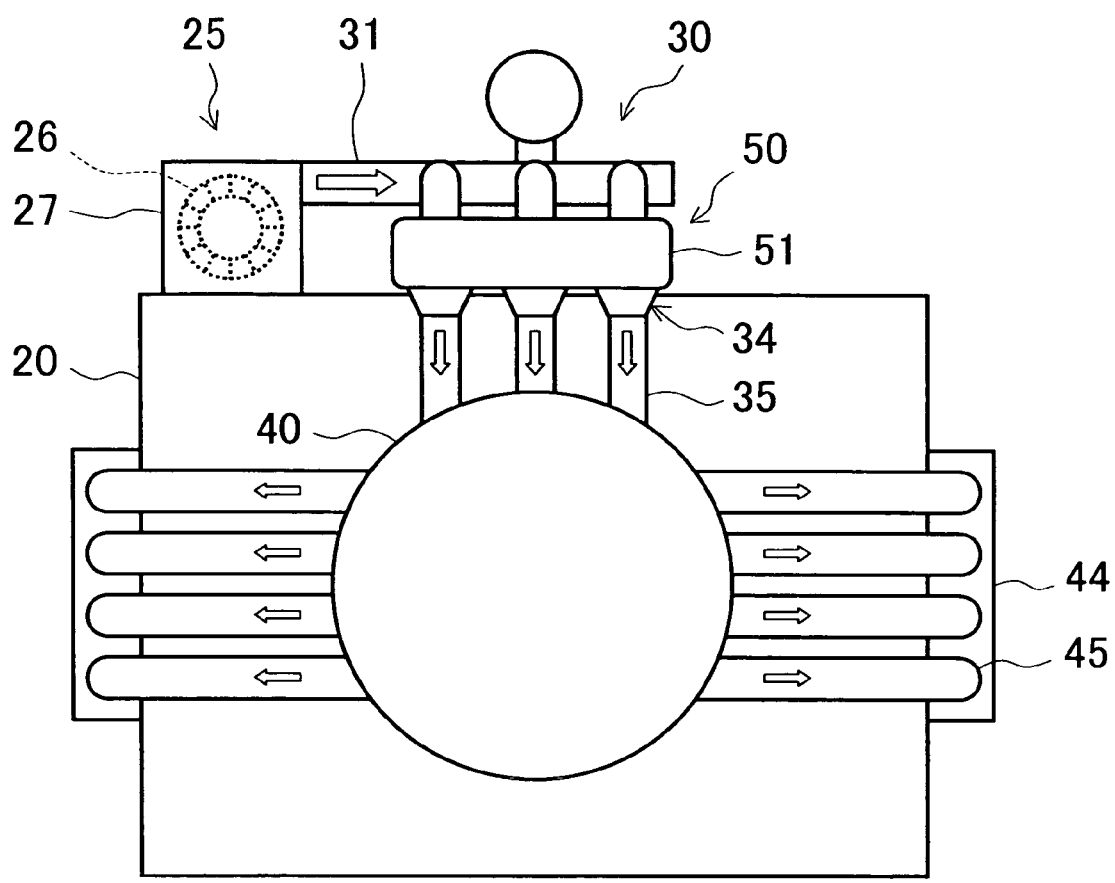
FIG. 6 A top view of the heating chamber.
Figure 7:
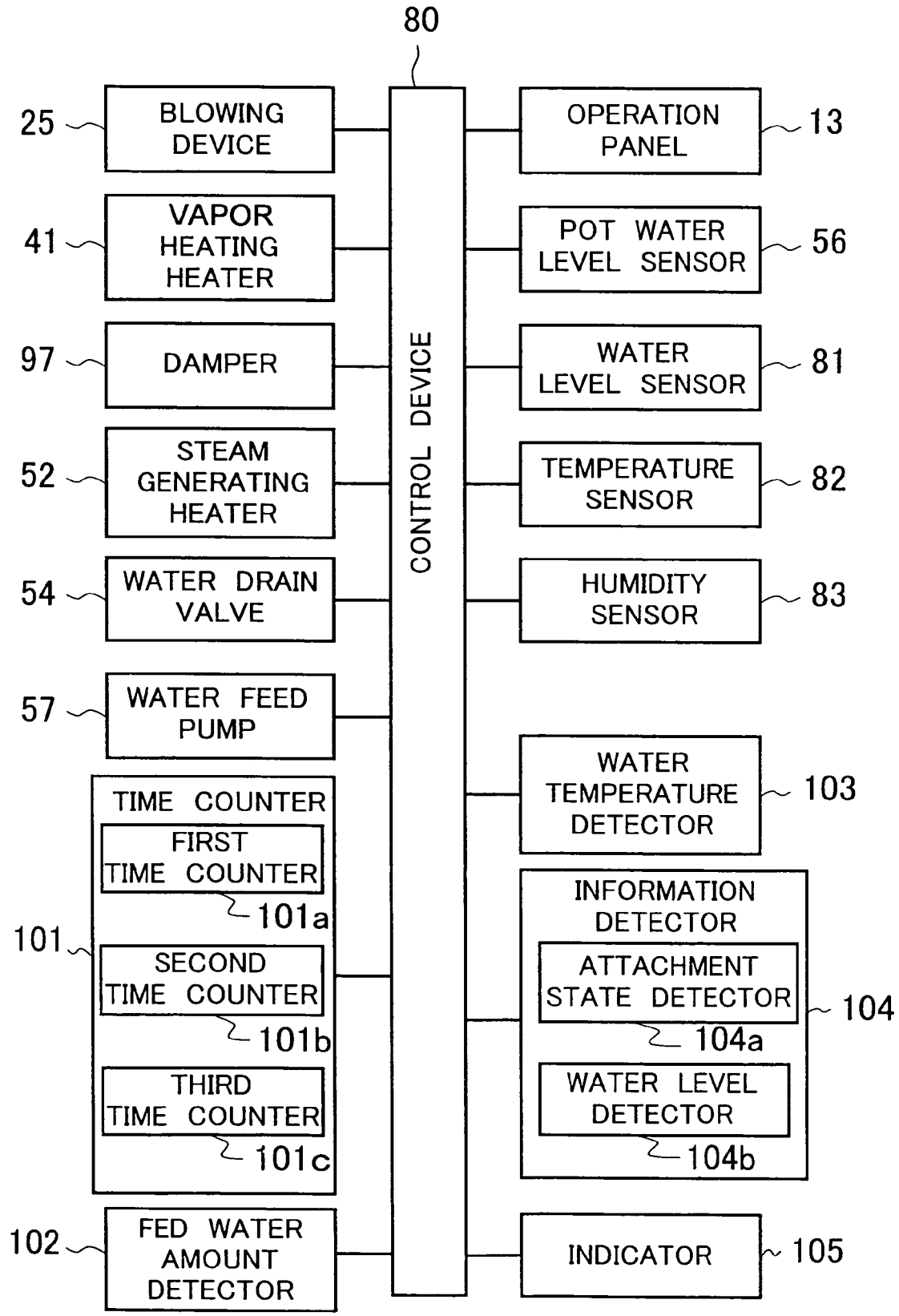
FIG. 7 A block diagram of the controlling means of the steam cooking apparatus.
Figure 8:
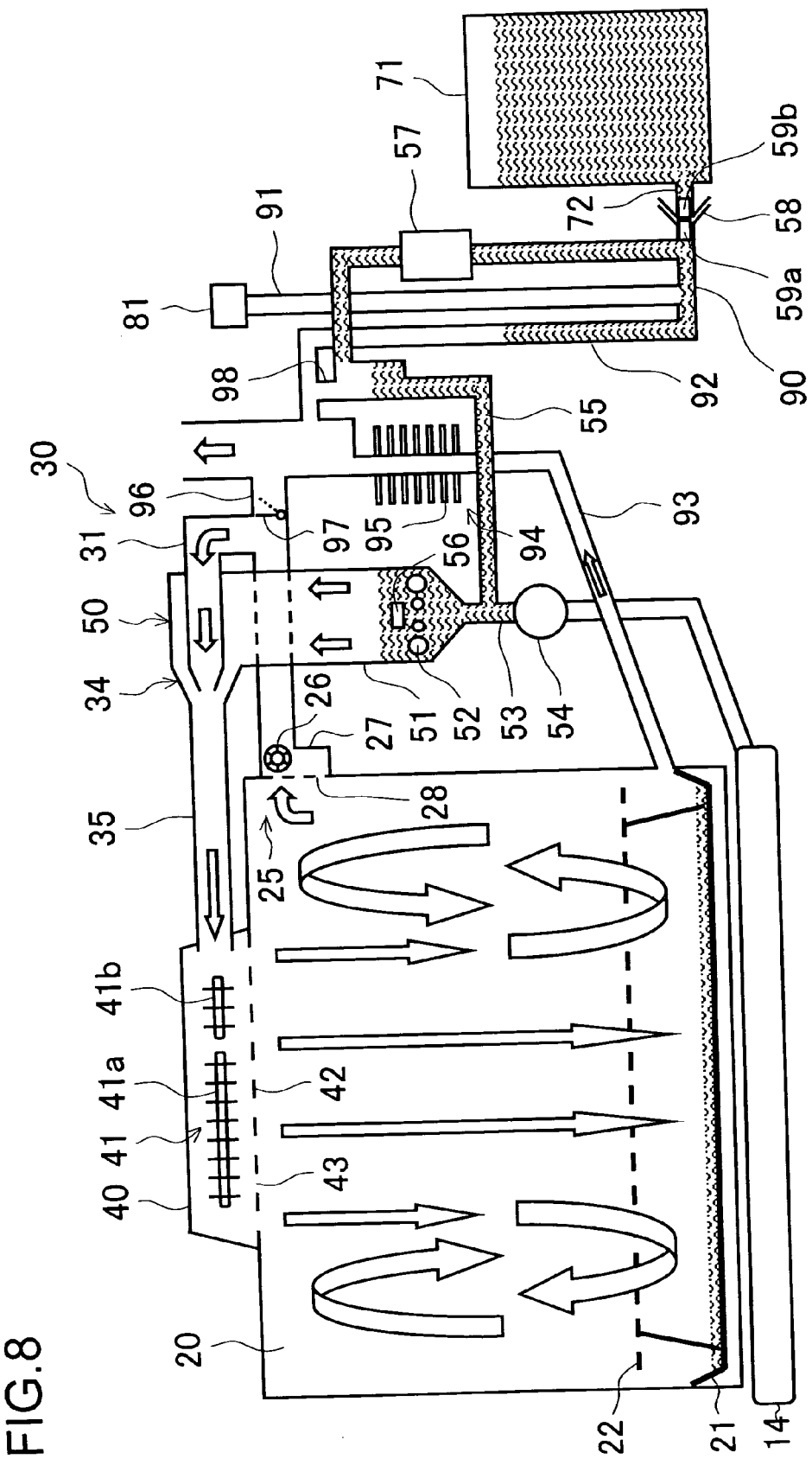
FIG. 8 A diagram illustrating the streams of steam inside the steam cooking apparatus, with no article-to-be-heated placed inside the heating chamber.
Figure 9:
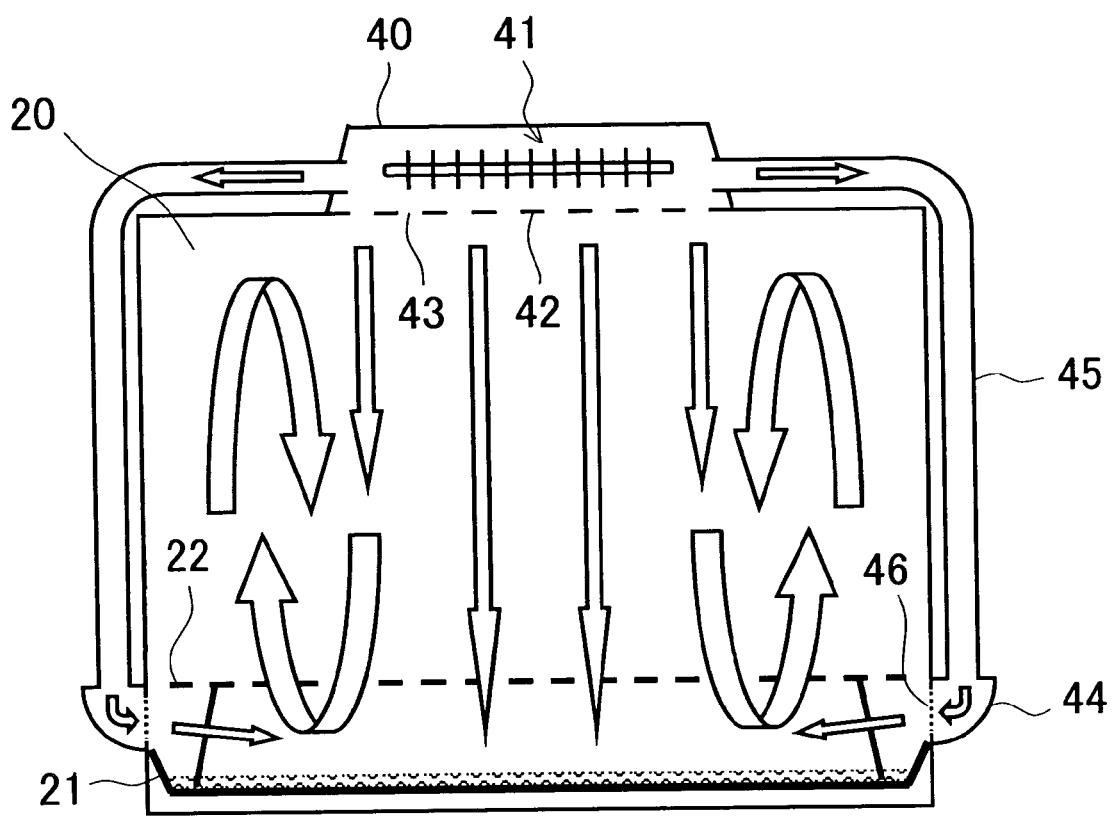
FIG. 9 A diagram illustrating the streams of steam inside the steam cooking apparatus, as seen from a direction perpendicular to FIG. 8.
Figure 10:
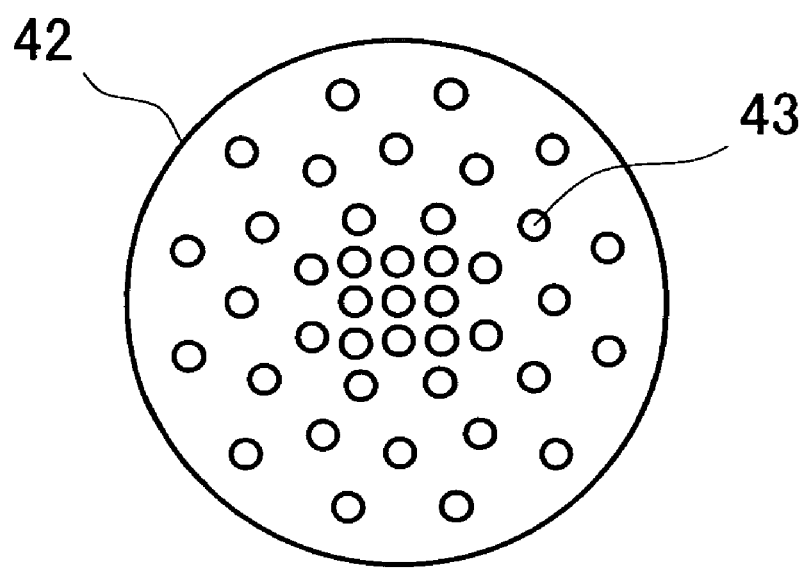
FIG. 10 A top view of the floor panel of the sub-cavity.
Figure 11:
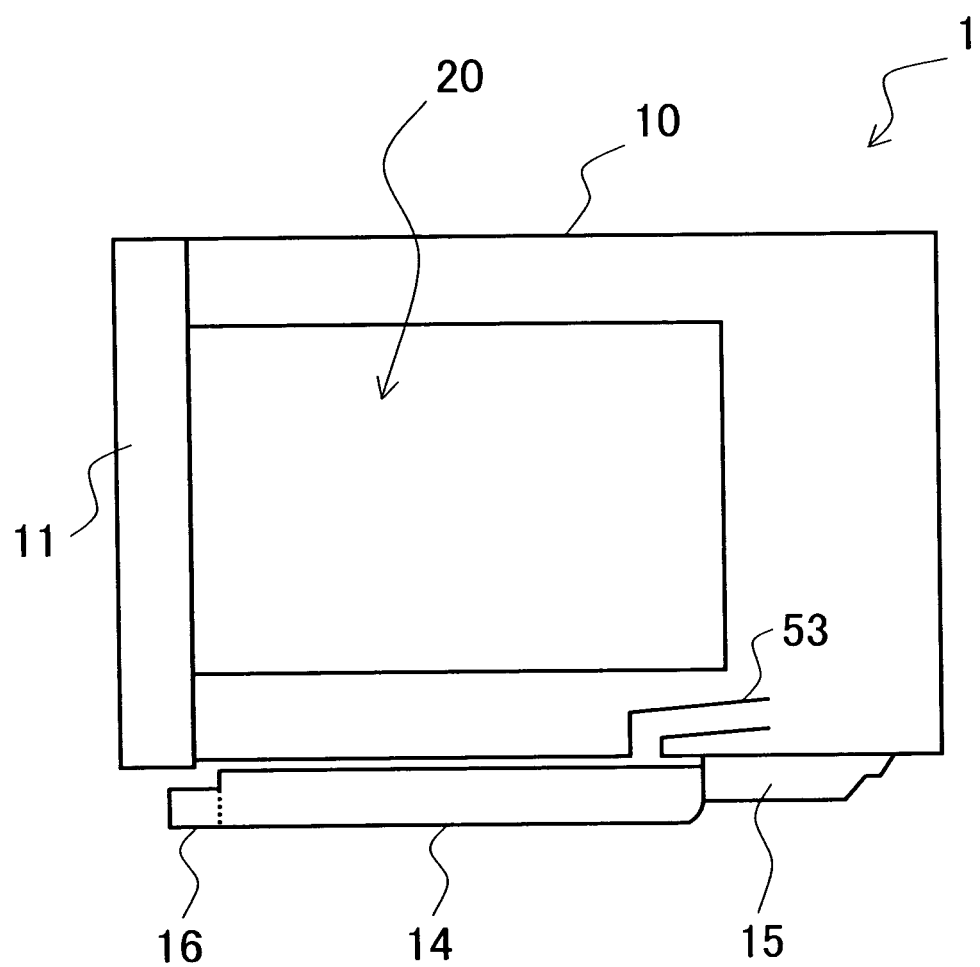
FIG. 11 A cross-sectional view schematically showing an outline of the construction around the water drain tank of the steam cooking apparatus.
Figure 12A:
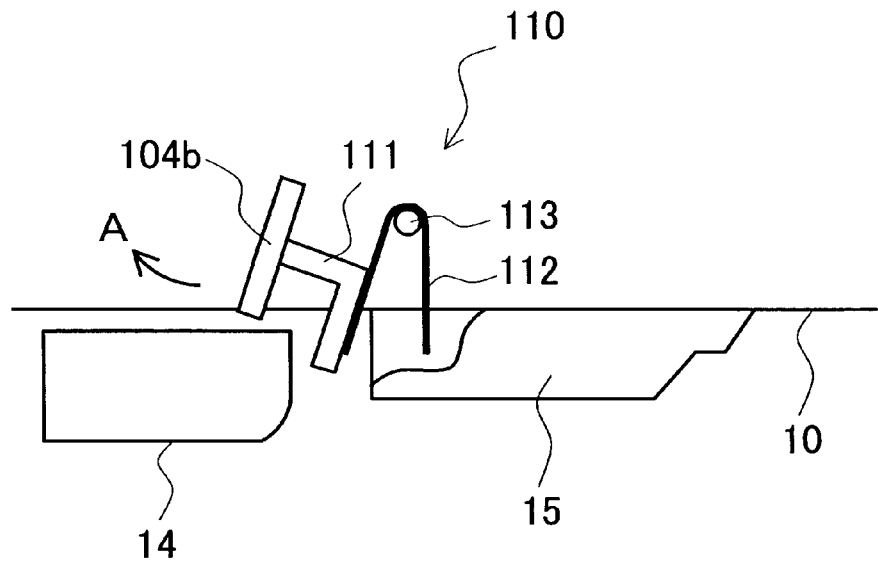
FIG. 12A A cross-sectional view of the steam cooking apparatus, showing an enlarged part thereof, with the water drain tank yet to be completely attached.
Figure 12B:
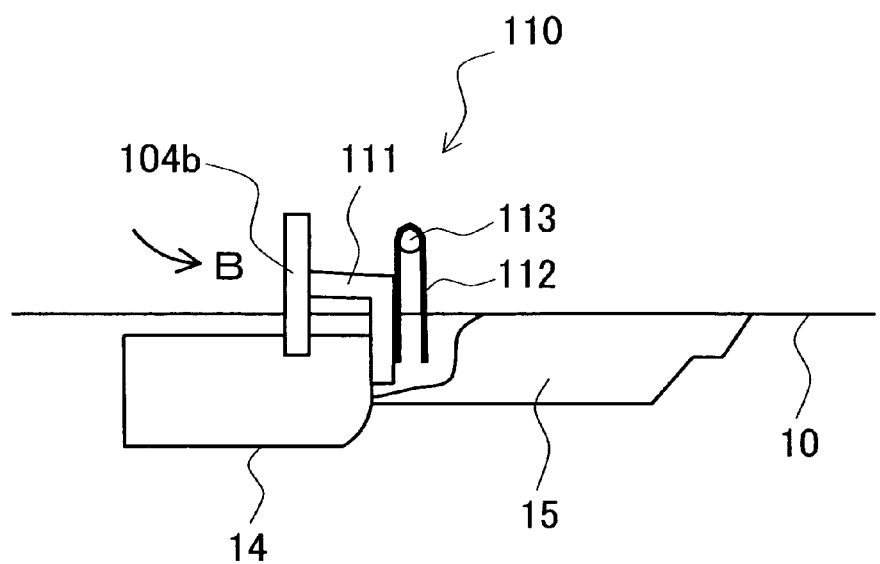
FIG. 12B A cross-sectional view of the steam cooking apparatus, showing an enlarged part thereof, with the water drain tank completely attached.

FIG. 1 is an external perspective view of a steam cooking apparatus 1 embodying the present invention. FIG. 2 is an external perspective view of the steam cooking apparatus 1, with the door 11 to the heating chamber 20 opened. FIG. 3 is a front view of the steam cooking apparatus, with the door 11 to the heating chamber 20 removed. FIG. 4 is a diagram illustrating the basic construction inside the steam cooking apparatus 1. FIG. 5 is a diagram illustrating the basic construction inside the steam cooking apparatus 1, as seen from a direction perpendicular to FIG. 4. FIG. 6 is a top view of the heating chamber 20. FIG. 7 is a block diagram of the controlling device 80 of the steam cooking apparatus 1. FIG. 8 is a diagram, like FIG. 4, illustrating the basic construction, but in a state different from that shown FIG. 4. FIG. 9 is a diagram, like FIG. 5, illustrating the basic construction, but in a state different from that shown FIG. 5. FIG. 10 is a top view of the floor panel 42 of the sub-cavity 40. FIG. 11 is a cross-sectional view schematically showing an outline of the construction around the water drain tank 14 of the steam cooking apparatus 1. FIGS. 12A and 12B are cross-sectional views of the steam cooking apparatus 1, showing an enlarged part thereof, respectively with the water drain tank yet to be completely attached and with the water drain tank completely attached.

The steam cooking apparatus 1 has a cabinet 10 in the shape of a rectangular parallelepiped. On the front face of the cabinet 10, a door 11 is provided. The door 11 is for opening and closing the opening of a heating chamber 20, and is supported on the cabinet 10 so as to be pivotable about the bottom edge of the door 11 in a vertical plane. Thus, when a handle 12 provided in an upper part of the door 11 is held and pulled frontward, the door 11 changes its position through 90 degrees from a vertical, closed state shown in FIG. 1 to a horizontal, opened state shown in FIG. 2. A middle part 11C of the door 11 has a pane of heat-resistant glass set therein to form a see-through part. On the left and right of the middle part 11C, a left-side part 11L and a right-side part 11R, each finished with a metal decoration plate, are arranged symmetrically. On the right-side part 11R, an operation panel 13 is provided. The operation panel 13 is an operation portion that permits the operation conditions of the apparatus to be set.

When the door 11 is opened, as shown in FIG. 2, the front face of the cabinet 10 appears. In the part of the cabinet 10 corresponding to the middle part 11C of the door 11, the above-mentioned heating chamber 20 is provided. In the part of the cabinet 10 corresponding to the left-side part 11L of the door 11, a water tank chamber 70 is provided. In the part of the cabinet 10 corresponding to the right-side part 11R of the door 11, a control circuit board is arranged inside, with no opening provided in front thereof.

The heating chamber 20 is a chamber in which an article-to-be-heated F is heated, and has the shape of a rectangular parallelepiped. The heating chamber 20 is completely open in the front face thereof at which it faces the door 11. The other faces of the heating chamber 20 are formed of stainless steel plates. Around the heating chamber 20, heat insulation is applied. On the floor surface of the heating chamber 20, a tray 21 formed of a stainless steel plate is placed, and, above the tray 21, a rack 22 formed of stainless steel wire is placed for placing the article-to-be-heated F thereon.

Inside the heating chamber 20, steam is present that is circulated through an outer circulation passage 30 shown in FIG. 4 (initially, inside the heating chamber 20, air is prevalent; when steam cooking is started, however, the air is gradually replaced with steam; throughout the following description, it is assumed that the gas inside the heating chamber 20 has been replaced with steam).

The outer circulation passage 30 starts with a suction port 28 provided in a corner of an upper part of the rear wall of the heating chamber 20. In this embodiment, as shown in FIG. 3, the suction port 28 is arranged in the upper left corner of the rear wall. The suction port 28 consists of a plurality of parallel slits arranged above one another. These slits are increasingly long upward and increasingly short downward so that together they form an opening in the shape of a right-angled triangle. The right-angled corner of the triangle fits the corner of the rear wall of the heating chamber 20. Thus, the suction port 28 is increasingly widely open toward the upper edge of the rear wall of the heating chamber 20, and is increasingly widely open toward the left edge thereof.

The suction port 28 is followed by a blowing device 25 that produces an air stream that flows through the outer circulation passage 30. The blowing device 25 is arranged close to the outer surface of a side wall of the heating chamber 20. Selected as this side wall here is the rear wall of the heating chamber 20. The blowing device 25 is provided with a centrifugal fan 26, a fan casing 27 for housing it, and a motor 29 for rotating the centrifugal fan 26. As the centrifugal fan 26, a sirocco fan can be used. As the motor 29, a direct-current motor capable of high-speed rotation can be used. The fan casing 27 is fixed on the outer surface of the rear wall of the heating chamber 20, on the lower right of the suction port 28, and has an air inlet port and an air outlet port.

Along the outer circulation passage 30, the blowing device 25 is followed by a steam generating device 50. The steam generating device 50 will be described in detail later. Like the blowing device 25, the steam generating device 50 is arranged close to the outer surface of the rear wall of the heating chamber 20; however, while the blowing device 25 is arranged rather in a left part of the heating chamber 20, the steam generating device 50 is arranged on the center line of the heating chamber 20.

In this way, the main components of the outer circulation passage 30, namely the suction port 28, the blowing device 25, and the steam generating device 50, are arranged around one side wall of the heating chamber 20, specifically the rear wall thereof. This helps shorten the length of the outer circulation passage 30. This in turn reduces the pressure loss across the outer circulation passage 30 and thereby enhances the blowing efficiency, and also reduces the heat-dissipating area of the outer circulation passage 30 and thereby reduces the heat loss. Altogether, the energy efficiency with which steam is circulated through the outer circulation passage 30 is enhanced. Moreover, the outer circulation passage 30 can be arranged without the need for an unduly large space, and thus the cabinet 10 can be made compact.

The part of the outer circulation passage 30 leading from the outlet port of the fan casing 27 to the steam generating device 50 is built with a duct 31; the part of the outer circulation passage 30 leading further on from the steam generating device 50 is built with a duct 35. The duct 35 is connected to a sub-cavity 40 provided adjacent to the heating chamber 20. Thus, the air stream that flows through the outer circulation passage 30 then flows through the sub-cavity 40 back into the heating chamber 20.

The sub-cavity 40 is provided above a ceiling part of the heating chamber 20 and, as seen in a plan view, above a central part of the ceiling part. The sub-cavity 40 has a circular shape as seen in a plan view, and, inside the sub-cavity 40, a vapor heating heater 41 is arranged as means for heating steam. The vapor heating heater 41 is composed of a main heater and a sub heater, of which each is built with a sheath heater.

The amount of heat generated by the main heater is larger than the amount of heat generated by the sub heater. The electric power consumption by the main heater is, for example, 1 000 W, and that by the sub heater is, for example, 300 W. These specific values, it should be noted, are merely given as preferred examples and are not meant to limit the implementation of the invention in any way. The main and sub heaters can be energized singly, one at a time, or together, both simultaneously.

In the ceiling part of the heating chamber 20, an opening as large as the sub-cavity 40 is formed, and, in this opening, a floor panel 42 that forms the floor surface of the sub-cavity 40 is fitted. In the floor panel 42, a plurality of upper jet holes 43 are formed. The upper jet holes 43 consist of small holes that are each directed straight downward and that are so located as to spread largely over the entire surface of the panel. Here, the upper jet holes 43 are so located as to spread within a plane, that is, two-dimensionally; it is, however, also possible to form elevations and depressions on the floor panel 42 so that the locations of the upper jet holes 43 spread quasi-three-dimensionally.

Both the upper and lower surfaces of the floor panel 42 are finished to be dark-colored through surface treatment such as painting. Incidentally, the floor panel 42 may be formed of a metal material whose color grows dark as use progresses; instead, the floor panel 42 may be formed of a dark-colored ceramic molding.

Instead of the floor surface of the sub-cavity 40 being formed with the floor panel 42 separately provided, the ceiling plate of the heating chamber 20 may, as it is, be shared as the floor surface of the sub-cavity 40. In this case, the part of the ceiling plate corresponding to the sub-cavity 40 has the upper jet holes 43 formed therein, and has the upper and lower surfaces thereof finished to be dark-colored.

With this construction where steam is fed through the sub-cavity 40 into the heating chamber 20, the distribution of the steam can be adjusted in the sub-cavity 40 so that the steam is jetted onto the article-to-be-heated F in a manner suitable to cook it. This, as compared with simply blowing steam from the outer circulation passage 30 into the heating chamber 20, permits more effective use of the heat energy of the steam in cooking.

Outside the left and right side walls of the heating chamber 20, small sub-cavities 44 are provided as shown in FIG. 5. The sub-cavities 44 are connected to the sub-cavity 40 through ducts 45 to receive steam from the sub-cavity 40 (see FIGS. 5 and 6). The ducts 45 are formed as pipes having a circular cross-sectional shape, and are preferably formed of pipes of stainless steel.

In lower parts of the side walls of the heating chamber 20, a plurality of side jet holes 46 are formed in positions corresponding to the sub-cavities 44. The side jet holes 46 are small holes that are each directed toward the article-to-be-heated F placed inside the heating chamber 20, more precisely, toward under the article-to-be-heated F. The side jet holes 46 permit steam to be jetted out therethrough toward the article-to-be-heated F placed on the rack 22. The heights and directions of the side jet holes 46 are so set that the steam blown out reaches under the article-to-be-heated F. Moreover, the side jet holes 46 are so positioned and/or directed that the steam blown out from the left and right sides meets under the article-to-be-heated F.

The side jet holes 46 may be formed in a separately provided panel, or may be formed in the side walls of the heating chamber 20 themselves, with small holes formed directly therein. In this respect, what has been stated above in connection with the upper jet holes 43 equally applies. In contrast to the sub-cavity 40, however, the parts corresponding to the sub-cavities 44 need not be finished to be dark-colored.

The total area of the side jet holes 46 at the left and right sides is made larger than the total area of the upper jet holes 43. Since the side jet holes 46 thus have a large total area, a large amount of steam needs to be fed thereto. To achieve this, for each sub-cavity 44, a plurality of ducts 45 (in the figures, four of them) are provided.

Next, the structure of the steam generating device 50 will be described. The steam generating device 50 serves as steam generating means; specifically, it generates steam by boiling water fed thereto from the later-described water feeding means (for example, a water feed pipe 55, a water feed pump 57, a water tank 71, and a water feed pipe 72), and then feeds the steam into the heating chamber 20.

The steam generating device 50 is provided with a cylindrical pot 51 arranged with the center line thereof vertical. The pot 51 has the vertical faces thereof formed with side walls of which the outline, as seen in a plan view, has a flat, elongate horizontal shape, such as a rectangular, oval, or like horizontal cross-sectional shape. The pot 51 may be formed of any material so long as it is heat-resistant. Specifically, the pot 51 may be formed of a metal, synthetic resin, or ceramic, or may be formed of a combination of different materials.

As shown in FIG. 6, the steam generating device 50 is arranged with one flat side face of the pot 51 parallel to the rear wall of the heating chamber 20. In this way, the steam generating device 50 can be arranged even in a case where there is only a narrow gap left between the outer surface of the heating chamber 20 and the inner surface of the cabinet 10. This helps reduce the just-mentioned gap and thereby make the cabinet 10 compact; thus, the space inside the cabinet 10 can be used more efficiently.

Water put in the pot 51 is heated with a steam generating heater 52 arranged in a bottom part of the pot 51. The steam generating heater 52 is built with a sheath heater, and is immersed in the water inside the pot 51 to directly heat it. Since the pot 51 is flat as seen in a plan view, the steam generating heater 52 is bent in a U shape, as seen in a plan view, to fit the inner surface of the pot 51. Like the vapor heating heater 41 provided in the sub-cavity 40, the steam generating heater 52 is composed of a main heater and a sub heater, with the former arranged outside and the latter inside. The main and sub heaters have different cross-sectional diameters, the main heater being thicker than the sub heater.

When arranging a sheath heater within a given area, as compared with arranging a sheath heater bent in a circular shape in a circular area, arranging a sheath heater bent in a flat shape like a U shape in a rectangular or oval area permits the sheath heater to be longer. That is, as compared with when a sheath heater bent in a circular shape is placed inside a pot having a circular cross-sectional shape, when a sheath heater bent in a flat shape like a U shape is placed inside a pot having an elongate horizontal cross-sectional shape, the ratio of the length of the sheath heater to a given amount of water is greater, thus the surface area of the sheath heater is larger, thus more electric power can be used, and thus heat is more easily conducted to water. Thus, with the steam generating device 50 of the embodiment, water can be heated quickly.

As with the vapor heating heater 41, also with the steam generating heater 52, the amount of heat generated by the main heater is larger than the amount of heat generated by the sub heater. The electric power consumption by the main heater is, for example, 700 W, and that by the sub heater is, for example, 300 W. Again, these specific values, it should be noted, are merely given as preferred examples and are not meant to limit the implementation of the invention in any way. The main and sub heaters can be energized singly, one at a time, or together, both simultaneously.

Above the pot 51, a steam sucker is formed that permits steam to be sucked into the air stream circulating through the outer circulation passage 30. The steam sucker is built with a steam suction ejector 34 that is formed to penetrate the pot 51 from one flat face to the opposite flat face thereof. The steam sucker serves to maintain the circulated air stream, and to keep it fed with fresh steam. Moreover, the use of the steam suction ejector 34 permits steam to be efficiently sucked into the circulated air stream. Here, as the steam suction ejector 34, three of them are arranged side by side, parallel to one another, at predetermined intervals, and at the same level.

Each steam suction ejector 34 is composed of an inner nozzle and an outer nozzle that surrounds the outlet end thereof. The steam suction ejector 34 extends in a direction in which it crosses the axis line of the pot 51. In this embodiment, the crossing angle is perpendicular; that is, the steam suction ejector 34 is arranged horizontal. To the inner nozzle, the duct 31 is connected and, to the outer nozzle, the duct 35 is connected. The steam suction ejector 34 is arranged at approximately the same height as the sub-cavity 40, and the duct 35 extends approximately horizontally. Connecting the steam sucker and the sub-cavity 40 rectilinearly with the horizontal duct 35 in this way helps minimize the path of the part of the outer circulation passage 30 leading further on from the steam sucker.

Having passed through the steam generating device 50, the outer circulation passage 30 divides into three paths through the three steam suction ejectors 34 and the ducts 35 following them. Thus, the pressure loss across the paths is reduced, the amount of steam circulated can be increased, and the steam can be quickly mixed with the gas flowing through the outer circulation passage 30.

As described above, the three steam suction ejectors 34 provided above the pot 51 form a steam sucker that is vertically flat, and cover a wide area. Thus, the area where suction of steam takes place is increased, the generated steam is sucked evenly, and the sucked steam is quickly sent out, further enhancing the steam generation performance of the steam generating device 50. Moreover, since the three steam suction ejectors 34 are arranged side by side at the same level, even in a case where there is no ample space in the height direction, a large amount of steam can be transported.

Back in FIG. 4, the pot 51 has a funnel-shaped bottom part, from which a water drain pipe 53 runs downward. Midway along the water drain pipe 53, a water drain valve 54 is provided. The water drain pipe 53 has a lower part thereof bent so as to run toward a lower part of the heating chamber 20 with a slope of a predetermined angle. Here, the water drain pipe 53 and the water drain valve 54 function as water draining means for draining the water inside the steam generating means (the steam generating device 50, in particular the pot 51 thereof).

Under the heating chamber 20, a water drain tank 14 is arranged so that it can be put into and taken out of the cabinet 10 through the front face thereof (where the heating chamber 20 has its opening). The water drain tank 14 is a container in which to collect the water drained by the water draining means, and receives the lower end of the water drain pipe 53. As shown in FIG. 11, when the water drain tank 14 is completely attached to the steam cooking apparatus 1, the rear end face of the water drain tank 14 (the end face thereof opposite to the door 11) makes contact with a contact portion 15 provided under the cabinet 10, so that the water drained through the water drain pipe 53 is collected in the water drain tank 14. With the water drain tank 14 pulled out, the water collected therein can be disposed of.

Moreover, under the door 11, a drip pan 16 is provided. The drip pan 16 is for receiving drips of the water that has collected on the door 11 as a result of the condensation of the steam fed into the heating chamber 20. The drip pan 16 thus prevents the water collected on the door 11 from dripping onto the floor.

The pot 51 shown in FIG. 4 is fed with water through a water feed passage. The water feed passage is built with a water feed pipe 55 that connects a water tank 71 to the water drain pipe 53. The water feed pipe 55 is connected to the water drain pipe 53 at a position higher than the water drain valve 54. The water feed pipe 55, starting from the position where it is connected to the water drain pipe 53, first ascends and then descends to form an inverted U shape. Midway in the descending part of the water feed pipe 55, a water feed pump 57 is provided. The water feed pipe 55 leads to a funnel-shaped inlet port 58. A horizontal connection pipe 90 connects the water feed pipe 55 to the inlet port 58.

Inside the pot 51, a pot water level sensor 56 is arranged. The pot water level sensor 56 is located slightly higher than the steam generating heater 52.

Into the water tank chamber 70, a water tank 71 in the shape of a rectangular parallelepiped having a small lateral width is inserted. From a bottom part of the water tank 71 runs a water feed pipe 72, which is connected to the inlet port 58. The water feed pipe 55, the water feed pump 57, the water tank 71, and the water feed pipe 72 function as water feeding means for feeding water to the steam generating means (steam generating device 50).

When the water tank 71 is pulled out of the water tank chamber 70, the water feed pipe 72 disconnects from the inlet port 58, and thus, unless some measure is taken, the water inside the water tank chamber 70 and the water in the water feed pipe 55 spills out. To prevent this, the inlet port 58 and the water feed pipe 72 are fitted with coupling plugs 59a and 59b. When the water feed pipe 72 is connected to the inlet port 58 as shown in FIG. 4, the coupling plugs 59a and 59b couple to each other to permit passage of water; when the water feed pipe 72 is disconnected from the inlet port 58, the coupling plugs 59a and 59b are each shut to prevent water from spilling out of the water feed pipe 55 and the water tank 71.

To the connection pipe 90 are connected, in order from the inlet port 58 side end thereof, the water feed pipe 55, a pressure detection pipe 91, and a pressure release pipe 92. At the upper end of the pressure detection pipe 91, a water level sensor 81 is provided. The water level sensor 81 measures the water level inside the water tank 71. An upper part of the pressure release pipe 92 is horizontally bent, and is connected to an exhaust passage through which to let steam escape out of the heating chamber 20.

The exhaust passage is built with a duct 93. The duct 93 extends from a side wall of the heating chamber 20, and runs while gradually increasing its height to eventually lead out of the apparatus, i.e. out of the cabinet 10. Inside the heating chamber 20, the entrance to the duct 93 is open above the tray 21. Thus, if there is any liquid flowing downward, in the direction opposite to the exhaustion direction, through the duct 93, it is collected in the tray 21.

At least part of the duct 93 is formed into a heat dissipating portion 94. The heat dissipating portion 94 is built with a metal pipe having a plurality of radiating fins on the outside thereof.

A part of the duct 93 near the upper end thereof passes by the duct 31. Here, between the duct 31 and the duct 93, a connection passage is provided. This connection passage is built with a duct 96, and, inside this duct 96, an electrically driven damper 97 is provided. Normally, the damper 97 keeps the duct 96 closed.

The highest part of the water feed pipe 55 leads, through an overflow water passage, to the duct 93. The overflow water passage is built with an overflow water pipe 98 of which one end is connected to the water feed pipe 55 and of which the other end is connected to the upper-end horizontal part of the pressure release pipe 92. The height of the position at which the pressure release pipe 92 is connected to the duct 93 is the overflow level. The overflow level is set to be higher than the normal water level inside the pot 51 and lower than the steam suction ejector 34.

The duct 93 is given a larger cross-sectional diameter in a part thereof starting from near where the duct 93 is connected to the overflow water pipe 98 and the duct 96 to where the duct 93 leads out of the apparatus. This part can be formed of a synthetic resin.

The operation of the steam cooking apparatus 1 is controlled by a control device 80 shown in FIG. 7. The control device 80 includes a microprocessor and a memory, and controls the steam cooking apparatus 1 according to a predetermined program. The status of control is indicated in a display portion on the operation panel 13. The control device 80 receives operation instructions from various operation keys arranged on the operation panel 13 as they are operated. On the operation panel 13, a sound generating device is also arranged that generates various sounds.

Connected to the control device 80 is not only the operation panel 13 but also the blowing device 25, the vapor heating heater 41, the damper 97, the steam generating heater 52, the water drain valve 54, the pot water level sensor 56, the water feed pump 57, and the water level sensor 81. Further connected to the control device 80 are: a temperature sensor 82 for sensing the temperature inside the heating chamber 20; and a humidity sensor 83 for sensing the humidity inside the heating chamber 20.

In this embodiment, the control device 80 also functions as controlling means for controlling the operation of the draining means mentioned above, and the most distinctive feature of the present invention lies in how this draining means is controlled, as will be described later.

The steam cooking apparatus 1 is operated and operates as follows. First, the door 11 is opened, then the water tank 71 is pulled out of the water tank chamber 70, and then water is poured into the tank through an unillustrated water feed port thereof. Filled with water, the water tank 71 is then pushed back into the water tank chamber 70 and is set in position. When the end of the water feed pipe 72 is confirmed to have been securely connected to the inlet port 58 of the water feed passage, an article-to-be-heated F is placed inside the heating chamber 20, and the door 11 is closed. Then, a power key on the operation panel 13 is pressed to turn the power on, and the operation keys provided on the operation panel 13 are operated to select a cooking menu and make various settings.

When the water feed pipe 72 is connected to the inlet port 58, the water tank 71 leads to the pressure detection pipe 91, and the water level sensor 81 detects the water level inside the water tank 71. If the water level (water amount) is found to be sufficient to execute the selected cooking menu, the control device 80 starts to generate steam; if the water level (water amount) is found to be insufficient to execute the selected cooking menu, the control device 80 indicates the corresponding warning on the operation panel 13. In this case, the control device 80 does not start to generate steam until the shortage of water is overcome.

When it becomes possible to start to generate steam, the water feed pump 57 starts to operate, and starts to feed water to the steam generating device 50. At this point, the water drain valve 54 is closed.

Water collects inside the pot 51 from the bottom up. When the water level is detected to have reached a predetermined level by the water level sensor 56, water stops being supplied. Now, electric power starts to be supplied to the steam generating heater 52. The steam generating heater 52 heats the water inside the pot 51 directly.

At the same time that electric power starts to be supplied to the steam generating heater 52, or when the water inside the pot 51 is found to have reached a predetermined temperature, electric power starts to be supplied also to the blowing device 25 and the vapor heating heater 41. The blowing device 25 sucks in, through the suction port 28, the steam in the heating chamber 20, and blows it out into the steam generating device 50. Here, since the blowing out of steam is achieved with the centrifugal fan 26, a higher pressure can be produced than with a propeller fan. In addition, since the centrifugal fan 26 is rotated at a high speed with a direct-current motor, the air stream produced has an extremely high flow speed.

The high flow speed of the air stream here helps reduce the cross-sectional area of the flow passage in comparison with the flow rate. This permits the pipe that largely forms the outer circulation passage 30 to have a circular cross-sectional shape and a comparatively small diameter, and thus helps give the outer circulation passage 30 a smaller surface area than when it is formed as a duct having a rectangular cross-sectional shape. Thus, although hot steam passes through it, the outer circulation passage 30 dissipates less heat, enhancing the energy efficiency of the steam cooking apparatus 1. In a case where the outer circulation passage 30 is wrapped with a heat insulating material, the amount of it needed can be reduced.

At this point, the damper 97 keeps closed the duct 96 leading from the duct 31 to the duct 93. The steam blown out of the blowing device 25 under pressure flows through the duct 31 into the steam suction ejector 34, then flows through the duct 35 into the sub-cavity 40.

When the water in the pot 51 boils, it generates saturated steam at 100° C. and at one atmosphere. The saturated steam enters, through the steam suction ejector 34, the outer circulation passage 30. The ejector structure here permits the saturated steam to be sucked in quickly and mixed with the circulated air stream. Moreover, the ejector structure prevents the steam generating device 50 from being acted upon by a pressure, and thereby permits the saturated steam to be discharged freely.

The steam that has exited from the steam suction ejector 34 flows through the duct 35 into the sub-cavity 40. The steam that has entered the sub-cavity 40 is heated to 300° C. by the vapor heating heater 41, and is thus turned into overheated steam. Part of the overheated steam is jetted out downward through the upper jet holes 43. Another part of the overheated steam flows through the ducts 45 into the sub-cavities 44, and is then jetted out sideways through the side jet holes 46.

FIGS. 8 and 9 show the streams of steam as observed when no article-to-be-heated F is placed inside the heating chamber 20. Through the upper jet holes 43, steam is jetted out downward so strongly as to reach the floor surface of the heating chamber 20. The steam hits the floor surface and changes its flow direction outward. The steam thus moves out of the downward blow and starts to rise. Since steam, in particular overheated steam, is light, this turning of the flow direction occurs naturally. Consequently, inside the heating chamber 20, convection occurs with a falling stream at the center and a rising stream around, as indicated by arrows in the figure.

To produce effective convection, the upper jet holes 43 are arranged ingeniously. Specifically, as shown in FIG. 10, the upper jet holes 43 are so arranged as to be dense in a central part of the floor panel 42 and sparse in a peripheral part thereof. This weakens the strength of the downward blow of steam in the peripheral part of the floor panel 42 so as not to hamper the rise of steam, and thus helps produce more effective convection.

Through the side jet holes 46, steam is jetted out sideways. The steam meets in a central part of the heating chamber 20, and then enters the convection produced by the steam from the upper jet holes 43. The steam flowing by convection is partly sucked out through the suction port 28. The steam then circulates through the outer circulation passage 30 to the sub-cavity 40, and then returns to the heating chamber 20. In this way, the steam inside the heating chamber 20 repeatedly flows out into the outer circulation passage 30 and then back into the heating chamber 20.

When an article-to-be-heated F is placed inside the heating chamber 20, the overheated steam heated to about 300° C. and jetted out through the upper jet holes 43 hits the article-to-be-heated F and delivers heat thereto. In this process, the temperature of the steam drops to about 250° C. The overheated steam that has touched the surface of the article-to-be-heated F condenses on the surface of the article-to-be-heated F and thereby releases latent heat. This too heats the article-to-be-heated F.

As shown in FIGS. 4 and 5, after delivering heat to the article-to-be-heated F, the steam changes its direction outward and moves out of the downward blow. Since steam is light as described previously, having moved out of the downward blow, the steam starts to rise, producing convection inside the heating chamber 20 as indicated by arrows. This convection maintains the temperature inside the heating chamber 20, and keeps the article-to-be-heated F hit by the overheated steam just heated in the sub-cavity 40, permitting a large amount of heat to be applied quickly to the article-to-be-heated F.

The steam jetted out sideways through the side jet holes 46 reaches, from the left and right sides, under the rack 22 and meets under the article-to-be-heated F. Although the steam jetted out through the side jet holes 46 is directed originally in directions tangential to the surface of the article-to-be-heated F, as a result of the steam from the left and right sides meeting, it does not flow straight on, but stagnates and fills under the article-to-be-heated F. The steam thus behaves as if blown in directions normal to the surface of the article-to-be-heated F. This ensures that the heat of steam is delivered to the lower part of the article-to-be-heated F.

As described above, with the steam from the side jet holes 46, the part of the article-to-be-heated F that is not hit by the steam from the upper jet holes 43 is as well cooked as the upper part. This contributes to an evenly-cooked, neat-looking result. Moreover, the article-to-be-heated F receives heat evenly from around the surface thereof. Thus, the article-to-be-heated F is heated to the center sufficiently in a short time.

The steam from the side jet holes 46, too, originally has a temperature of about 300° C., and, after it hits the article-to-be-heated F, its temperature drops to about 250° C., during which process the steam delivers heat to the article-to-be-heated F. Moreover, when the steam condenses on the surface of the article-to-be-heated F, it releases latent heat, and thereby heats the article-to-be-heated F.

After delivering heat to the lower part of the article-to-be-heated F, the steam from the side jet holes 46 enters the convection produced by the steam from the upper jet holes 43. The steam flowing by convection is partly sucked out through the suction port 28. The steam then circulates through the outer circulation passage 30 to the sub-cavity 40, and then returns to the heating chamber 20. In this way, the steam inside the heating chamber 20 repeatedly flows out into the outer circulation passage 30 and then back into the heating chamber 20.

As time passes, the amount of steam inside the heating chamber 20 increases. Excessive steam is exhausted out of the apparatus through the duct 93. If the steam is exhausted, as it is, outside the cabinet 10, condensation occurs on wall surfaces around, leading to growth of mold. However, since the heat dissipating portion 94 is provided midway along the duct 93, while the steam is passing therethrough, it is deprived of its heat and condenses on the inner surface of the duct 93. Thus, only a negligible amount of steam escapes out of the cabinet 10, and therefore no serous problems result. The water produced through condensation on the inner surface of the duct 93 flows downward, in the direction opposite to the exhaustion direction, and is collected in the tray 21. This water can be disposed of, along with the water otherwise collected in the tray 21, after the completion of cooking.

The side jet holes 46 are located away from the sub-cavity 40, and are therefore located disadvantageously from the perspective of jetting out steam. Nevertheless, as a result of the total area of the left and right side jet holes 46 being larger than the total area of the upper jet holes 43, a sufficient amount of steam can be guided to the side jet holes 46, permitting the upper and lower parts of the article-to-be-heated F to be heated more evenly.

Since the article-to-be-heated F is heated while the steam inside the heating chamber 20 is circulated, the steam cooking apparatus 1 operates with high energy efficiency. Moreover, since the overheated steam from above is jetted out downward through the plurality of upper jet holes 43 that are so located as to spread largely over the entire floor panel 42, largely the entire article-to-be-heated F is enveloped in the steam from above. As a result of overheated steam hitting the article-to-be-heated F, and this hitting taking place over a large area, the heat of overheated steam is quickly delivered to the article-to-be-heated F. Moreover, as a result of the steam having entered the sub-cavity 40 being heated by the vapor heating heater 41 and thus expanding, the steam is jetted out with increased strength, and thus hits the article-to-be-heated F at an increased speed. This permits the article-to-be-heated F to be heated further quickly.

The centrifugal fan 26 can generate a pressure higher than a propeller fan can, and thus helps increase the strength with which steam is jetted out through the upper jet holes 43. This permits overheated steam to be jetted out so strongly as to reach the floor surface of the heating chamber 20, and thus permits the article-to-be-heated F to be heated intensely. The centrifugal fan 26 is rotated at a high speed with a direct-current motor to produce a strong stream. This helps enhance the benefits mentioned above.

Moreover, the strong blowing power of the blowing device 25 greatly helps to achieve quick exhaustion of steam through an exhaust port 32 when the door 11 is opened.

Since the floor panel 42 of the sub-cavity 40 is dark-colored on the upper surface thereof, it absorbs well the heat radiated from the vapor heating heater 41. The radiated heat absorbed by the floor panel 42 is then radiated, from the equally dark-colored lower surface of the floor panel 42, into the heating chamber 20. This reduces the rise in the temperatures inside and on the outer surface of the sub-cavity 40, enhancing safety. Moreover, as a result of the heat radiated from the vapor heating heater 41 being conducted through the floor panel 42 to the heating chamber 20, the heating chamber 20 is heated more efficiently. The floor panel 42 may have a circular shape as viewed in a plan view, or may have a rectangular shape geometrically similar to the heating chamber 20 as viewed in a plan view. As described previously, the ceiling wall of the heating chamber 20 may be shared as the floor panel of the sub-cavity 40.

In a case where the article-to-be-heated F is, for example, meat or the like, as its temperature rises, melted fat may drip down therefrom. In a case where the article-to-be-heated F is a liquid put in a container, when it boils, part of it may boil over. Anything that drips down or boils over in such a way is collected in the tray 21, so as to be disposed of after the completion of cooking.

As the steam generating device 50 continues generating steam, the water level inside the pot 51 falls. When the water level sensor 56 detects that the water level has fallen to a predetermined level, the control device 80 restarts the operation of the water supply pump 57. The water supply pump 57 sucks up water from the water tank 71 to replenish the pot 51 with as much water as has evaporated. When the water level sensor 56 detects that the water level inside the pot 51 has risen back to a predetermined level, the control device 80 stops the operation of the water supply pump 57.

Due to the failure of the pot water level sensor 56 or the water feed pump 57, or for other causes, if the water feed pump 57 fails to stop its operation, the water level inside the pot 51 continues to rise beyond the predetermined level. When the water level reaches the overflow level, the water fed from the water feed pump 57 overflows through the overflow water pipe 98 into the duct 93. Thus, it does not occur that the water inside the pot 51 flows through the steam suction ejector 34 into the outer circulation passage 30. The water that has entered the duct 93 is collected in the tray 21.

The tray 21 has an area and a volume large enough to collect a considerable amount of water. Even then, its volume is limited. Accordingly, it is advisable to take some safety measure to indicate a warning or forcibly stop the operation of the water feed pump 57 when the water feed pump 57 continues its operation for an abnormally long time.

On completion of cooking, the control device 80 indicates a corresponding message on the operation panel 13 and sounds an alert. Notified of the completion of cooking with these message and alert, the user opens the door 11, and takes the article-to-be-heated F out of the heating chamber 20.

When the door 11 starts to be opened, the control device 80 switches the damper 97 into a state in which it opens the duct 96. Now, the air stream flowing through the outer circulation passage 30 flows through the duct 96 to the duct 93, and thus almost no part of it flows to the steam generating device 50. This reduces the amount of steam that flows into the subcavity 40, and thus now the jetting out, if ever, of steam through the upper jet holes 43 and the side jet holes 46 is extremely weak. This permits the user to take out the article-to-be-heated F safely without being hit with steam and burnt on the face, hand, or other part of the body. As long as the door 11 is open, the damper 97 keeps the duct 96 open.

No circulation of steam has thus been conducted through the duct 96 and the duct 93, and accordingly these are not so hot as the outer circulation passage 30. Thus, the steam that has flown from the outer circulation passage 30 into the duct 96 and the duct 93 condenses when it makes contact with the inner wall thereof. The condensed water flows down through the duct 93 and is collected in the tray 21. This water can be disposed of, along with the water otherwise collected in the tray 21, after the completion of cooking.

If the blowing device 25 is started all over from a resting state to achieve exhaustion, a time lag arises until it reaches a steadily blowing state. In this embodiment, the blowing device 25 is already operating, and thus no time lag arises. Moreover, the air stream that has thus far been circulating through the heating chamber 20 and the outer circulation passage 30 becomes, as it is, the air stream exhausted out through the duct 93. Thus, no time lag arises even for changing the direction of the air stream. This makes it possible to quickly exhaust the steam inside the heating chamber 20 and thereby to shorten the time for which the door 11 needs to be kept inhibited from being opened.

When the user starts to open the door 11, this condition can be recognized by the control device 80, for example, in the following manner. A latch for keeping the door 11 closed is provided between the cabinet 10 and the door 11, and a latch lever for unlocking the latch is provided on the a handle 12 so as to be exposed out of it. A switch that opens and closes as the latch or the latch lever is operated is arranged inside the door 11 or a handle 12 so that, when the user grips the handle 12 and the latch lever to unlock, the switch transmits a signal to the control device 80.

In a case where there is a long pause before cooking is performed next time, or in a case where, in a cold-climate area, no cooking is scheduled until the morning the next day, after the completion of cooking, the water drain valve 54 is opened through operation on the operation panel 13 to remove water from the pot 51. This prevents the water inside the pot 51 from being infected with germs, algae, and the like and from freezing.

Next, as the most distinctive feature of the present invention, how the control device 80 controls drainage will be described. First, the configuration relevant to the control of drainage will be described.

As shown in FIG. 7, to the control device 80 are connected a time counter 101, a fed water amount detector 102, a water temperature detector 103, an information detector 104, and an indicator 105.

The time counter 101 is composed of a first time counter 101a, a second time counter 101b, and a third time counter 101c.

The first time counter 101a functions as first time counting means for counting the retention time for which the water present inside the steam generating means (the pot 51) is retained there. More specifically, the first time counter 101a counts, as a first retention time, the retention time for which the water fed into the steam generating means before evaporation thereby (this water will hereinafter be referred to as "before-evaporation water") is retained inside the steam generating means and, as a second retention time, the retention time for which the water after evaporation by the steam generating means (this water will hereinafter be referred to as "after-evaporation water") is retained inside it.

Here, the time point at which to start to count the first retention time is set to be, for example, the time point at which the pot 51 is fed with water from the water tank 71 by the water feed pump 57. The time point at which to start to count the second retention time is set to be, for example, the time point at which the pot 51 stops generating steam (at which steam-cooking ends). Irrespective of whether the water present inside the pot 51 is before-evaporation or after-evaporation water, it takes time of the order of hours and days for the water to get spoilt, and therefore the time points at which to start to count the first and second retention times need not be set precisely at the time points mentioned above.

The second time counter 101b functions as second time counting means for counting the total time that has elapsed after the water feeding means (the water tank 71 and the water feed pump 57) started to feed water to the steam generating means (the pot 51). Here, the "total" time after the start of the feeding of water includes, not only periods (time) during which the feeding of water actually took place, but also periods (time) during which no feeding of water actually took place, irrespective of whether the feeding of water, after once started, took place continuously or intermittently.

The third time counter 101c functions as third time counting means for counting the total water feed time, which is the total of only those periods during which the pot 51 was actually fed with water after once the water feeding means started feeding water to the pot 51. That is, the total water feed time does not include periods during which no feeding of water actually took place in a case where the feeding of water took place intermittently. In this respect, the total water feed time is different from the time counted by the second time counter 101b.

The fed water amount detector 102 functions as fed water amount detecting means for detecting the total amount of water that the water feeding means has fed to the pot 51. The water temperature detector 103 functions as water temperature detecting means for measuring the temperature of the water inside the pot 51.

The information detector 104 functions as information detecting means for detecting information on the water drain tank 14 (see FIG. 4) or information on the water inside it. More specifically, the information detector 104 has an attachment state detector 104a and a water level detector 104b. The attachment state detector 104a detects whether or not the water drain tank 14 is attached to the steam cooking apparatus 1. The water level detector 104b detects whether or not water is present inside the water drain tank 14 and the water level there. The indicator 105 functions as an indicating means for indicating a warning when the information detector 104 detects that the water drain tank 14 is not attached to the steam cooking apparatus 1 or that the water level inside the water drain tank 14 is higher than a predetermined water level. As an indication of a warning, an audible alert may be sounded, or a message may be displayed on the operation panel 13.

The water level detector 104b is built with, for example, a self-heated thermistor. Suppose that the self-heated thermistor is heated to 120° C. If the self-heated thermistor touches water at 100° C. (when drained, 50 to 60° C.), its temperature drops below 100° C. Accordingly, when the temperature of the self-heated thermistor is 100° C. or higher, the water level detector 104b recognizes that no water is present inside the water drain tank 14 and, when the temperature of the self-heated thermistor is lower than 100° C., the water level detector 104b recognizes that water is present inside the water drain tank 14. Thus, the water level detector 104b detects the water level inside the water drain tank 14 only when water is present there.

In this embodiment, the steam cooking apparatus 1 is provided with a movable member 110 (see FIGS. 12A and 12B) that changes the position of the water level detector 104b as the water drain tank 14 is put into and taken out of the steam cooking apparatus 1. This will be described later.

In this embodiment, the operation panel 13 also functions as input means via which the user enters an instruction to drain.

Configured as described above, the control device 80 controls the drainage of the water inside the pot 51 by the draining means (the water drain pipe 53 and the water drain valve 54) in the following manner.

First, when the retention time counted by the time counter 101 (the first time counter 101a) has reached a predetermined time, the control device 80 makes the draining means drain the water inside the pot 51. Here, the predetermined time can be set to be, for example, shorter than the time in which the water inside the steam generating means is likely to get spoilt. More specifically, if the water inside the pot 51 is before-evaporation water, it contains chlorine, and is therefore less prone to get spoilt. Thus, the predetermined time can be set to be comparatively long, for example about three days. On the other hand, if the water inside the pot 51 is after-evaporation water, it has lost chlorine through evaporation, and is therefore prone to get spoilt. Thus, the predetermined time can be set to be comparatively short, for example about one day.

Second, after the water feeding means started to feed water to the pot 51, when the time (the total time after the start of the feeding of water) counted by the time counter 101 (the second time counter 101b) has reached a predetermined time, the control device 80 makes the draining means drain the water inside the pot 51. Here, if once boiled water is kept inside the pot 51, since it has lost chorine, it gets spoilt in, at the earliest, two or three days or, at the latest, one or two weeks, and starts to produce foul orders and prompt mold growth. Accordingly, in this embodiment, the predetermined time is set to be one day.

Third, when the total amount of water that the water feeding means has fed to the pot 51, i.e. the total amount of fed water as detected by the fed water amount detector 102, has reached a predetermined amount, the control device 80 makes the draining means drain the water inside the pot 51.

Fourth, when the total time for which the water feeding means has fed water to the pot 51, i.e. the total water feed time as counted by the time counter 101 (the third time counter 101c), has reached a predetermined time, the control device 80 makes the draining means drain the water inside the pot 51.

Fifth, when an instruction to drain is entered via the operation panel 13, the control device 80 makes the draining means drain the water inside the pot 51.

Through one of the first to fifth manners of control described above, the draining means drains the water inside the pot 51. This reduces the deposition and collection, as scale, of impurities (for example, Ca and Mg) contained in the water inside the pot 51, and thus helps keep the interior of the pot 51 sanitary. The clogging of the drain out of the pot 51 resulting from the collection of scale inside the pot 51 can also be alleviated.

Moreover, through the control described above, the drainage of the water inside the pot 51 takes place when one of the following conditions is fulfilled: (1) the retention time of the water inside the pot 51 has reached a predetermined time; (2) the total time after the water feeding means started to feed water to the pot 51 has reached a predetermined time; (3) the total amount of water that the water feeding means has fed to the pot 51 has reached a predetermined amount; (4) the total time for which the water feeding means has fed water to the pot 51 has reached a predetermined time; and (5) an instruction to drain is entered via the operation panel 13.

That is, unless one of the conditions (1) to (5) above is fulfilled, even when the operation of apparatus is stopped meanwhile, no water is drained out of the pot 51. This eliminates the need to drain water out of the pot 51 frequently, i.e. every time the operation of the steam cooking apparatus is stopped, and thus helps avoid unduly increasing the amount of water consumed. This in turn reduces the frequency with which the user needs to replenish the water tank 71 with water, and thus helps reduce the work burden on the user.

In particular, in a case where the water inside the pot 51 is drained as a result of the condition (4) being fulfilled, the user can, by operating the operation panel 13, drain at the desired time. This enhances the usability of the apparatus.

Moreover, through one of the different manners of control described above, the water inside the pot 51 is drained before it is likely to get spoilt. This prevents spoilt water from being retained inside the pot 51, and thus helps keep the interior of the pot 51 sanitary.

When drainage is controlled under the condition (1), the control device 80 may alternatively control in the following manner.

While the first time counter 101a is counting, as a first retention time, the retention time of the before-evaporation water, when the first retention time has reached a first predetermined time set with respect to the before-evaporation water, the control device 80 makes the draining means drain the water inside the pot 51. Here, the first predetermined time is set to be shorter than the time in which the before-evaporation water containing chlorine is likely to get spent, and is therefore set to be, for example as described, about three days.

On the other hand, while the first time counter 101a is counting, as a second retention time, the retention time of the after-evaporation water, when the second retention time has reached a second predetermined time set with respect to the after-evaporation water, the control device 80 makes the draining means drain the water inside the pot 51. Here, the second predetermined time is set to be shorter than the time in which the after-evaporation water having lost chlorine is likely to get spent, and is therefore set to be, for example as described, one day.

As a result of the control device 80 controlling drainage in this way, the before-evaporation water or after-evaporation water present inside the pot 51 is drained before it gets spoilt inside the pot 51. This prevents the water (before-evaporation water or after-evaporation water) retained inside the pot 51 from being retained spoilt there.

The control device 80 may control drainage according to the operation status of the steam cooking apparatus 1. More specifically, according to the operation status of the steam cooking apparatus 1, the control device 80 may select one of the first and second retention times counted by the first time counter 101a and select one of the first and second predetermined times so that, when the selected retention time has reached the selected predetermined time, the control device 80 makes the draining means drain the water inside the pot 51.

For example, when the steam cooking apparatus 1 is in a state in which the pot 51 has been fed with water from the water tank 71 but the pot 51 is yet to be operated, water containing chlorine is present inside the pot 51. On the other hand, when the steam cooking apparatus 1 is in a state in which the heating chamber 20 has been fed with steam from the pot 51 and the operation of the steam cooking apparatus 1 has then been stopped, water having lost chlorine is retained inside the pot 51. Between water containing chlorine and water containing no chlorine, the time in which it gets spoilt differs as descried previously.

Accordingly, through the above-described drainage control performed by the control device 80 according to the operation status of the steam cooking apparatus 1, it is possible to easily grasp, according to the operation status of the steam cooking apparatus 1, whether the water present inside the pot 51 is before-evaporation water containing chlorine or after-evaporation water containing no chlorine before actually draining the water inside the pot 51. Thus, irrespective of whether the water present inside the pot 51 is before-evaporation water containing chlorine or after-evaporation water containing no chlorine, the water can surely be prevented from getting spoilt and being retained inside the pot 51.

Incidentally, when the water inside the pot 51 is hotter than a predetermined temperature (for example, 55° C.), the impurities contained therein are rather prompted to crystallize. Thus, draining the water in this state makes deposition and collection of scale inside the pot 51 more likely.

Thus, the control device 80 may so control that, when the temperature of the water inside the pot 51 as detected by the water temperature detector 103 is equal to or higher than a predetermine temperature, the draining means is stopped from draining the water inside the pot 51 and, when the temperature of the water inside the pot 51 becomes lower than the predetermined temperature, the draining means drains the water inside the pot 51. This prevents the water inside the pot 51 from being drained while it is so hot as to prompt deposition and collection of scale. Thus, deposition and collection of scale inside the pot 51 resulting from such drainage can surely be reduced.

When water is drained out of the pot 51, if the water drain tank 14 is not attached to the steam cooking apparatus 1, the drained water spills out of the steam cooking apparatus 1. To prevent this, the control device 80 may so control that, only when the attachment state detector 104a of the information detector 104 detects that the water drain tank 14 is attached to the steam cooking apparatus 1, the draining means drains the water inside the pot 51 to the water drain tank 14. Through this control, the drainage of water out of the pot 51 is performed only when the water drain tank 14 is attached to the steam cooking apparatus 1. This ensures that the water drained out of the pot 51 is collected in the water drain tank 14 so as not to spill out.

Even when the water drain tank 14 is attached to the steam cooking apparatus 1, if the water level of the water collected in the water drain tank 14 at the moment (when drainage is started) is higher than a predetermined water level, as newly drained water adds to the water inside the water drain tank 14, the amount of water inside the water drain tank 14 exceeds the permitted amount, and may overflow out of it.

To prevent this, it is preferable that the control device 80 so control that, only when the information detector 104 (the water level detector 104b) detects that the water level inside the water drain tank 14 is equal to or lower than a predetermined water level, the draining means drains the water inside the pot 51 to the water drain tank 14. In this case, if the water level of the water collected in the water drain tank 14 is higher than the predetermined water level, no more water is drained to the water drain tank 14. This surely prevents newly drained water from overflowing out of the water drain tank 14.

In this way, according to the information detected by the information detector 104, the control device 80 controls the drainage of the water inside the pot 51 by the draining means. This ensures that the drained water is collected in the water drain tank 14, and thus surely prevents the drained water from overflowing out of the water drain tank 14.

Moreover, when the information detector 104 detects that the water drain tank 14 is not attached to the steam cooking apparatus 1, or that the water level inside the water drain tank 14 is higher than the predetermined water level, under the control of the control device 80, the indicator 105 indicates a warning. With this indication of the warning, the user can be prompted to take some measure as by attaching the water drain tank 14 to the steam cooking apparatus 1 or by disposing of the water collected inside the water drain tank 14. In this way, the water inside the pot 51 can be promptly made ready to be drained so that the water inside the pot 51 can be drained.

Next, the movable member 110 mentioned previously will be described. As shown in FIGS. 12A and 12B, the movable member 110 is composed of a coupling portion 111 and biasing means 112.

The coupling portion 111 couples together the water level detector 104b and the biasing means 112. The coupling portion 111 is so bent as to make contact, at the end thereof opposite to the end coupled to the water level detector 104b, with the water drain tank 14. The biasing means 112 biases the coupling portion 111 in such a direction that, as the coupling portion 111 rotates in that direction about a shaft 113, the water drain tank 14 that makes contact with the coupling portion 111 is detached from the steam cooking apparatus 1.

In the following description, for the sake of convenience, the just-mentioned rotation direction is referred to as direction A, and the direction opposite thereto is referred to as direction B. Moreover, it is assumed that the shaft 113 is located above the coupling portion 111, on the contact portion 15 side thereof.

Thus, as shown in FIG. 12A, when the water drain tank 14 is not attached, since the coupling portion 111 only receives the biasing force of the biasing means 112, the coupling portion 111 and the water level detector 104b rotates in direction A about the shaft 113. As a result, the water level detector 104b coupled to the coupling portion 111 is located higher than the position in which the water drain tank 14 is supposed to be located when attached. Thus, in this state, when the water drain tank 14 is attached to the steam cooking apparatus 1, the water drain tank 14 does not touch the water level detector 104b.

As the water drain tank 14 continues to be slid in the direction in which it is attached to the steam cooking apparatus 1, the water drain tank 14 eventually touches the coupling portion 111 and pushes it inward against the biasing force of the biasing means 112. As a result, the coupling portion 111 and the water level detector 104b rotate in direction B about the shaft 113 until, as shown in FIG. 12B, their rotation stops at the position where the water drain tank 14 touches the contact portion 15. In this state, as a result of the just-mentioned rotation in direction B, the water level detector 104b now has its tip located inside the water drain tank 14, and is thus ready to detect the water level of the water inside the water drain tank 14.

As described above, since the steam cooking apparatus 1 is provided with the movable member 110, as the water drain tank 14 is taken out of and put into the steam cooking apparatus 1, the water level detector 104b changes its position. This prevents the water level detector 104b from being hit by the water drain tank 14 and damaged when the water drain tank 14 is taken out and put in, and thus prevents the failure of the detection of the water level inside the water drain tank 14.

So long as the water level detector 104b can change its position as the water drain tank 14 is taken out of and put into the steam cooking apparatus 1, the movable member 110 may adopt any structure to permit the rotation of the coupling portion 111. For example, the slide mechanism of the coupling portion 111 and the slide mechanism of the water level detector 104b may be so combined that, when in contact with the water drain tank 14, the coupling portion 111 slides to permit the water level detector 104b to slide in a different direction therefrom, with the result that, as the water drain tank 14 is taken out of and put into the steam cooking apparatus 1, the water level detector 104b changes its position. The movable member 110 can be realized with many different structures.

In this embodiment, the steam inside the heating chamber 20 is passed through the outer circulation passage 30 and then through the sub-cavity 40 back into the heating chamber 20. That is, the suction port 28 and the steam generating means are coupled together so as to form a circulation system (the outer circulation passage 30) in which steam is circulated between inside and outside the heating chamber 20. With this construction, steam can be used efficiently, and in addition high-temperature steam suitable for the heating of a article-to-be-heated F can be quickly obtained to heat the article-to-be-heated F. Needless to say, any other configuration may be adopted. For example, the sub-cavity 40 may be kept fed with fresh steam while the steam overflowing out of the heating chamber 20 is kept discharged through a steam discharge pipe 47.

In this embodiment, the door 11 of the steam cooking apparatus 1 opens at the top end thereof with respect to the opening 20a in the front face of the heating chamber 20. Any other construction, however, may be adopted. For example, the present invention is applicable also to a steam cooking apparatus 1 in which a rectangular door 11 opens at the right-hand end thereof by rotating about a rotation axis running vertically along the left-hand end thereof.

It should be understood that, in carrying out the present invention, many modifications and variations are possible within the spirit thereof.

INDUSTRIAL APPLICABILITY

The present invention finds application in cooking apparatuses in general that perform cooking by the use of overheated steam, irrespective of whether they are for household use or business use.

The invention claimed is:

1. A steam cooking apparatus comprising:
steam generating means that generates steam from water fed thereinto from water feeding means and that feeds the steam into a heating chamber in which an article-to-be-heated is heated;
first time counting means that counts a retention time for which the water present inside the steam generating means is retained there;
water draining means that drains the water inside the steam generating means; and
controlling means that controls operation of the water draining means,
wherein when the retention time counted by the first time counting means has reached a predetermined time, the controlling means makes the water draining means drain the water inside the steam generating means,
wherein the first time counting means counts, as a first retention time, a time for which the water that is fed from the water feeding means and retained inside the steam generating means before generation of the steam by the steam generating means and that contains chlorine is retained, and
wherein when the first retention time has reached a first predetermined time set with respect to the water, the controlling means makes the water draining means drain the water inside the steam generating means.

2. A steam cooking apparatus comprising:
steam generating means that generates steam from water fed thereinto from water feeding means and that feeds the steam into a heating chamber in which an article-to-be-heated is heated;
first time counting means that counts a retention time for which the water present inside the steam generating means is retained there;
water draining means that drains the water inside the steam generating means; and
controlling means that controls operation of the water draining means,
wherein when the retention time counted by the first time counting means has reached a predetermined time, the controlling means makes the water draining means drain the water inside the steam generating means,
wherein the first time counting means counts, as a second retention time, a time for which the water that is retained inside the steam generating means after completion of generation of the steam by the steam generating means and that has chlorine contained therein reduced by evaporation is retained, and
wherein when the second retention time has reached a second predetermined time set with respect to the water, the controlling means makes the water draining means drain the water inside the steam generating means.

3. A steam cooking apparatus comprising:
steam generating means that generates steam from water fed thereinto from water feeding means and that feeds the steam into a heating chamber in which an article-to-be-heated is heated;
first time counting means that counts a retention time for which the water present inside the steam generating means is retained there;
water draining means that drains the water inside the steam generating means; and
controlling means that controls operation of the water draining means,
wherein when the retention time counted by the first time counting means has reached a predetermined time, the controlling means makes the water draining means drain the water inside the steam generating means, wherein the first time counting means counts, as a first retention time, a time for which the water that is fed from the water feeding means and retained inside the steam generating means before generation of the steam by the steam generating means and that contains chlorine is retained, and also counts, as a second retention time, a time for which the water that is retained inside the steam generating means after completion of generation of the steam by the steam generating means and that has the chlorine contained therein reduced by evaporation is retained, according to operation status of the steam cooking apparatus, and wherein the controlling means selects one of the first and second retention times, and selects one of a first predetermined time set with respect to the water that is fed from the water feeding means and retained inside the steam generating means before generation of the steam by the steam generating means and that contains chlorine and a second predetermined time set with respect to the water that is retained inside the steam generating means after completion of generation of the steam by the steam generating means and that has the chlorine contained therein reduced by evaporation, and when the selected retention time has reached the selected predetermined time, the controlling means makes the water draining means drain the water inside the steam generating means.

4. The steam cooking apparatus of claim 1, further comprising:

water temperature detecting means that measures a water temperature of the water inside the steam generating means, wherein when the water temperature detected by the water temperature detecting means is equal to or higher than a predetermined temperature, the controlling means stops the water draining means from draining the water inside the steam generating means.

5. The steam cooking apparatus of claim 1, further comprising:

a water drain tank in which the water that is drained by the water draining means and that is to be disposed of is collected; and information detecting means that detects information on the water drain tank or on the water inside the water drain tank, wherein the water feeding means comprises a water tank in which water to be fed to inside the steam generating means is stored, wherein the water drain tank is provided separately from the water tank of the water feeding means, and wherein_according to the information detected by the information detecting means, the controlling means controls drainage of the water inside the steam generating means by the water draining means.

6. The steam cooking apparatus of claim 5, wherein the information detecting means includes an attachment state detector that detects an attachment state of the water drain tank, and when the attachment state detector detects that the water drain tank is attached to the steam cooking apparatus, the controlling means makes the water draining means drain the water inside the steam generating means.

7. The steam cooking apparatus of claim 5, wherein the information detecting means includes a water level detector that detects a water level of the water inside the water drain tank, and when the water level detector detects that the water level of the water inside the water drain tank is equal to or lower than a predetermined water level, the controlling means makes the water draining means drain the water inside the steam generating means.

8. The steam cooking apparatus of claim 5, further comprising:

indicating means that indicates a warning when the information detecting means detects that the water drain tank is not attached to the steam cooking apparatus or that a water level of the water inside the water drain tank is higher than a predetermined water level.

9. The steam cooking apparatus of claim 7, further comprising:

a movable member that changes a position of the water level detector as the water drain tank is put into or taken out of the steam cooking apparatus.

10. The steam cooking apparatus of claim 2, further comprising:

water temperature detecting means that measures a water temperature of the water inside the steam generating means, wherein when the water temperature detected by the water temperature detecting means is equal to or higher than a predetermined temperature, the controlling means stops the water draining means from draining the water inside the steam generating means.

11. The steam cooking apparatus of claim 2, further comprising:

a water drain tank in which the water that is drained by the water draining means and that is to be disposed of is collected; and information detecting means that detects information on the water drain tank or on the water inside the water drain tank, wherein the water feeding means comprises a water tank in which water to be fed to inside the steam generating means is stored, wherein the water drain tank is provided separately from the water tank of the water feeding means, and wherein according to the information detected by the information detecting means, the controlling means controls drainage of the water inside the steam generating means by the water draining means.

12. The steam cooking apparatus of claim 11, wherein the information detecting means includes an attachment state detector that detects an attachment state of the water drain tank, and when the attachment state detector detects that the water drain tank is attached to the steam cooking apparatus, the controlling means makes the water draining means drain the water inside the steam generating means.

13. The steam cooking apparatus of claim 11, wherein the information detecting means includes a water level detector that detects a water level of the water inside the water drain tank, and when the water level detector detects that the water level of the water inside the water drain tank is equal to or lower than a predetermined water level, the controlling means makes the water draining means drain the water inside the steam generating means.

14. The steam cooking apparatus of claim 11, further comprising:
indicating means that indicates a warning when the information detecting means detects that the water drain tank is not attached to the steam cooking apparatus or that a water level of the water inside the water drain tank is higher than a predetermined water level.

15. The steam cooking apparatus of claim 13, further comprising:
a movable member that changes a position of the water level detector as the water drain tank is put into or taken out of the steam cooking apparatus.

16. The steam cooking apparatus of claim 3, further comprising:
water temperature detecting means that measures a water temperature of the water inside the steam generating means,
wherein
when the water temperature detected by the water temperature detecting means is equal to or higher than a predetermined temperature, the controlling means stops the water draining means from draining the water inside the steam generating means.

17. The steam cooking apparatus of claim 3, further comprising:
a water drain tank in which the water that is drained by the water draining means and that is to be disposed of is collected; and
information detecting means that detects information on the water drain tank or on the water inside the water drain tank,
wherein the water feeding means comprises a water tank in which water to be fed to inside the steam generating means is stored,
wherein the water drain tank is provided separately from the water tank of the water feeding means, and
wherein according to the information detected by the information detecting means, the controlling means controls drainage of the water inside the steam generating means by the water draining means.

18. The steam cooking apparatus of claim 17,
wherein
the information detecting means includes an attachment state detector that detects an attachment state of the water drain tank, and
when the attachment state detector detects that the water drain tank is attached to the steam cooking apparatus, the controlling means makes the water draining means drain the water inside the steam generating means.

19. The steam cooking apparatus of claim 17,
wherein
the information detecting means includes a water level detector that detects a water level of the water inside the water drain tank, and
when the water level detector detects that the water level of the water inside the water drain tank is equal to or lower than a predetermined water level, the controlling means makes the water draining means drain the water inside the steam generating means.

20. The steam cooking apparatus of claim 17, further comprising:
indicating means that indicates a warning when the information detecting means detects that the water drain tank is not attached to the steam cooking apparatus or that a water level of the water inside the water drain tank is higher than a predetermined water level.

21. The steam cooking apparatus of claim 19, further comprising:
a movable member that changes a position of the water level detector as the water drain tank is put into or taken out of the steam cooking apparatus.

22. A steam cooking apparatus comprising:
steam generating device that generates steam from water fed thereto from a water feeding device and that feeds the steam into a heating chamber in which an article-to-be-heated is heated;
first time counter that counts a retention time for which the water present inside the steam generating device is retained there;
water draining device that drains the water inside the steam generating device; and
controller that controls operation of the water draining device,
wherein when the retention time counted by the first time counter has reached a predetermined time, the controller makes the water draining device drain the water inside the steam generating device,
wherein the first time counter counts, as a first retention time, a time for which the water that is fed from the water feeding device and retained inside the steam generating device before generation of the steam by the steam generating device and that contains chlorine_is retained, and
wherein when the first retention time has reached a first predetermined time set with respect to the water, the controller makes the water draining device drain the water inside the steam generating device.

23. A steam cooking apparatus comprising:
steam generating device that generates steam from water fed thereto from water feeding device and that feeds the steam into a heating chamber in which an article-to-be-heated is heated;
first time counter that counts a retention time for which the water present inside the steam generating device is retained there;
water draining device that drains the water inside the steam generating device; and
controller that controls operation of the water draining device,
wherein when the retention time counted by the first time counter has reached a predetermined time, the controller makes the water draining device drain the water inside the steam generating device,
wherein the first time counter counts, as a second retention time, a time for which the water that is retained inside the steam generating device after completion of generation of the steam by the steam generating device and that has chlorine contained therein reduced by evaporation is retained, and
wherein when the second retention time has reached a second predetermined time set with respect to the water, the controller makes the water draining device drain the water inside the steam generating device.

24. A steam cooking apparatus comprising:
steam generating device that generates steam from water fed thereto from water feeding device and that feeds the steam into a heating chamber in which an article-to-be-heated is heated;
first time counter that counts a retention time for which the water present inside the steam generating device is retained there;

water draining device that drains the water inside the steam generating device; and controller that controls operation of the water draining device, wherein when the retention time counted by the first time counter has reached a predetermined time, the controller makes the water draining device drain the water inside the steam generating device, wherein the first time counter counts, as a first retention time, a time for which the water that is fed from the water feeding device and retained inside the steam generating device before generation of the steam by the steam generating device and that contains chlorine is retained, and also counts, as a second retention time, a time for which the water that is retained inside the steam generating device after completion of generation of the steam by the steam generating device and that has the chlorine contained therein reduced by evaporation is retained, according to operation status of the steam cooking apparatus, and wherein the controller selects one of the first and second retention times, and selects one of a first predetermined time set with respect to the water that is fed from the water feeding device and retained inside the steam generating device before generation of the steam by the steam generating device and that contains chlorine and a second predetermined time set with respect to the water that is retained inside the steam generating device after completion of generation of the steam by the steam generating device and that has the chlorine contained therein reduced by evaporation, and when the selected retention time has reached the selected predetermined time, the controller makes the water draining device drain the water inside the steam generating device.

* * * * *